(12) United States Patent
Giacalone

(10) Patent No.: US 7,693,929 B2
(45) Date of Patent: Apr. 6, 2010

(54) HARDWARE EXTENSION FOR ACCELERATING FRACTIONAL INTEGER DIVISION WITHIN 3D GRAPHICS AND MP3 APPLICATIONS

(75) Inventor: Jean-Pierre Giacalone, Vence (FR)

(73) Assignee: Texas Instruments Incorporated, Dallas, TX (US)

( * ) Notice: Subject to any disclaimer, the term of this patent is extended or adjusted under 35 U.S.C. 154(b) by 1732 days.

(21) Appl. No.: 10/242,202

(22) Filed: Sep. 12, 2002

(65) Prior Publication Data

US 2004/0073591 A1 Apr. 15, 2004

(30) Foreign Application Priority Data

Aug. 20, 2002 (EP) ............................ 02292060

(51) Int. Cl.
*G06F 7/535* (2006.01)
(52) U.S. Cl. ..................................................... 708/650
(58) Field of Classification Search .................. 708/650
See application file for complete search history.

(56) References Cited

U.S. PATENT DOCUMENTS 3,852,581 A 12/1974 Reynard et al.
4,992,968 A * 2/1991 Adiletta ....................... 708/650
5,410,141 A * 4/1995 Koenck et al. ............ 235/472.02
5,708,458 A * 1/1998 Vrbanac ....................... 345/156
5,903,486 A * 5/1999 Curtet ......................... 708/655
6,529,929 B2 * 3/2003 Hong .......................... 708/550
6,895,419 B1 * 5/2005 Cargin et al. ................. 708/131
6,924,790 B1 * 8/2005 Bi ............................... 345/179

FOREIGN PATENT DOCUMENTS

EP 0 992 895 A1 4/2000
WO WO 94/06076 3/1994

* cited by examiner

*Primary Examiner*—David H Malzahn
(74) *Attorney, Agent, or Firm*—Ronald O. Neerings; Wade James Brady, III; Frederick J. Telecky, Jr.

(57) ABSTRACT

An apparatus and method for allowing a digital signal processor (DSP) in a data processing system to perform high speed division operations. In one embodiment of the invention a division operation is performed in no more than two cycles. In another embodiment of the invention, the division operations are in fractional format. The data processing apparatus comprises a random access memory, a processor (12, 168), and an interface (102) coupling said random access memory (104) to said processor, said interface enables high speed division operations associated with said processor. The interface of the present invention can also be combined with a dual or co-processor system to increase the data processing efficiency.

13 Claims, 29 Drawing Sheets

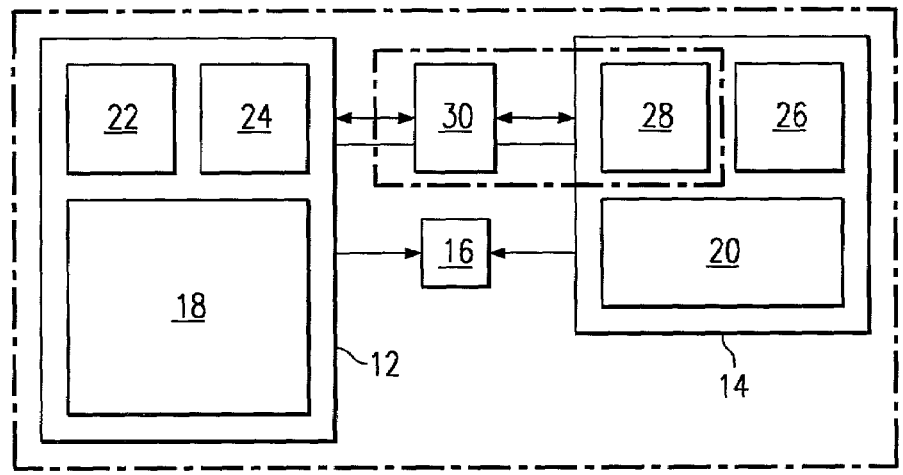
FIG. 1
*(PRIOR ART)*
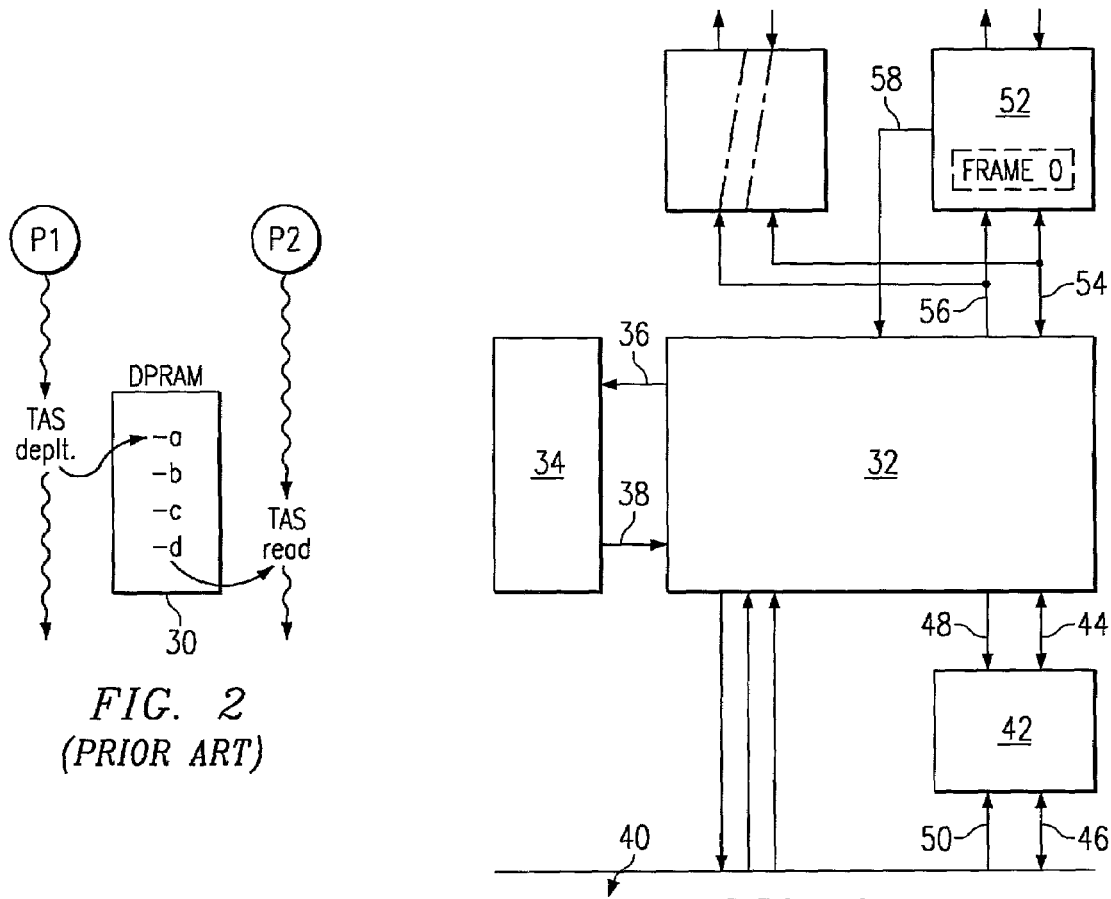
FIG. 2
*(PRIOR ART)*
FIG. 3
*(PRIOR ART)*

(Dmsbyte, Dlsbyte) (Cmsbyte, Clsbyte)

(Bmsbyte, Blsbyte)

SPLIT 16 BITS INTO 4 DIGITS OF 4 BITS

HARDWARE EXTENSION FOR ACCELERATING FRACTIONAL INTEGER DIVISION WITHIN 3D GRAPHICS AND MP3 APPLICATIONS

TECHNICAL FIELD OF THE INVENTION

This invention relates to the handling of graphics data in an electronic apparatus. More specifically, the invention relates to processing graphics data in an electronic apparatus using high speed division.

BACKGROUND OF THE INVENTION

Graphics handling is important in electronic devices utilizing a display as a means for outputting information to a viewer (typically a person). Two-dimensional (hereinafter "2D") graphics processing is currently state of the art in battery powered portable electronic devices, such as cell phones, personal digital assistants "PDAs", and games (e.g., Gameboy Advance), to name a few. 2D graphics handling is flat matching of pictures.

The typical mechanism used for displaying graphics output from such an electronic device is a display, such as a flat viewing screen While a flat viewing screen is a two dimensional screen, the objective is to place three-dimensional scenes onto a two-dimensional flat screen. In some modern computers (having a CPU with the processing power of at least a Pentium processor) three-dimensional (hereinafter "3D") graphics processing is provided. In 3D graphics processing, objects are positioned at various coordinates on a viewing screen. The objects themselves are bits of third elements (e.g., triangles), as is well known in the art. Many demanding operations must be implemented by the CPU to successfully implement 3D graphics processing. First operation, an object must be positioned with a common set of coordinates (i.e., the coordinates of the scene). Second operation, multiple scenes are generated on the object elements to make the object elements appear in the place(s) of the scene which is part of the scene that is displaced (e.g., the geometric pipeline). For example, an object A with have coordinates x, y, & z within a particular scene while another object B will have coordinates x', y' & z' in the same scene.

Third operation, the work of projection. The objective of projection is to make it appear to a viewer that he is always in front of the action in a scene, which is displayed onto a flat screen display. The positioning of objects on the display is designed by dividing the 3D coordinates of objects by the depth, which is the z-coordinate of the object. The most difficult part of image handling concerns the processing of objects which are one in front of the other in a scene. In a scene in which one object is partly, or wholly, in front of another object (superposition), data words (containing the same pixels) may have to be read several times. For example, assume object B is in view of a viewer. Assume also that object A is behind, and slightly overlapped by, object B. Usually, image A is drawn first and then image B, but the portion of object A that is overlapped by object B was already drawn. The result is that the pixels in the overlapped portion will be drawn two times in memory. So, a viewer will see only one thing—the superposition of the two images. In memory, however, the pixels in the juxtaposed area are drawn twice. The above task of drawing the images is called the "rasterization" or "rasterization task", which is screen filling. Rasterization is demanding in terms of computation requirements since all objects in a scene have to be stored in memory, which means that the whole screen itself has to be stored in memory.

Similarly, as screen dimensions get wider and/or higher more actions are required, such as more pixels to update, which consumes a lot of MIPS (millions of instructions per second) because of x & y coordinate values (bigger screen typically means more superposition of images). The fact that object A appears to coordinate x, y and z in the scene while image B appears in coordinates x', y' and z' in the scene is defined by the geometry pipeline.

Today, to the extent a personal computer ("PC") has 3D graphics processing (usually necessitating an expensive, power-hungry CPU, such as Intel's Pentium processor), it is performed on hardware specifically designed for such purposes. Unfortunately, high-powered and power-hungry processors, such as the Pentium, are much too expensive and consume too much power to be used in portable electronic devices, such as games, PDAs and cellular phones, and/or combinations of such devices. There remains a need for 3D graphics handling capability to such devices.

SUMMARY OF THE INVENTION

The present invention discloses an apparatus and method for enabling a digital signal processor (DSP) in a data processing system to perform high speed division operations. In one embodiment of the invention a division operation is performed in no more than two cycles. In another embodiment of the invention, the division operations are in fractional format. The data processing apparatus comprises a random access memory, a processor (12, 168), and an interface (102) coupling said random access memory (104) to said processor, said interface enables high speed division operations associated with said processor. The interface of the present invention can also be combined with a dual or co-processor system to increase the data processing efficiency.

BRIEF DESCRIPTION OF THE DRAWINGS

For a more complete understanding of the present invention and for further advantages thereof, reference is now made to the following detailed description in conjunction with the drawings in which:

FIG. 1 is a block diagram of a prior art dual-processor data processing system.

FIG. 2 represents the writing by a program P1 of parameters for a program P2 in a memory of the system of FIG. 1.

FIG. 3 is a general overall diagram of processor 14 of FIG. 1.

PREFERRED EMBODIMENTS OF THE INVENTION

Figure 4:
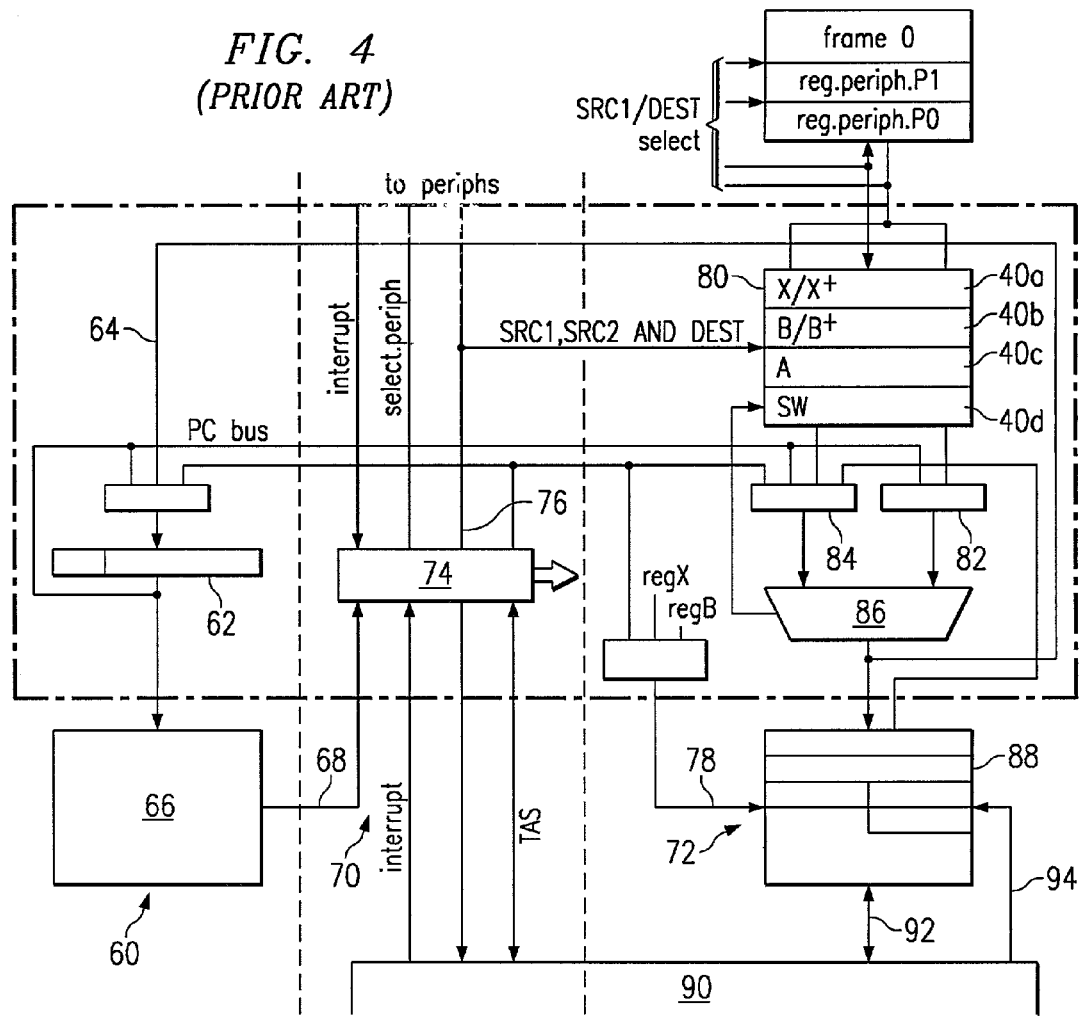
FIG. 4 is a more detailed overall diagram of processor 14 of FIG. 1.

Present portable electronic devices, such as cell phones, personal digital assistants "PDAs", and games (e.g., Gameboy Advance), to name a few, tend to be battery powered, consume low power (compared to computers), have low processing requirements (compared to computers), and are relatively cheap (compared to computers).

3D graphics imaging and rendering pipelines and MP3 processing are tasks with very demanding MIPS requirements. While some of these tasks have been handled to date by expensive and power hungry central processing units (such as the Pentium processor) in desk top computers and some portable computers with considerable battery storage capacity, there is no solution today to accomplish these tasks in relatively inexpensive electronic devices (typically small battery powered devices such as cell phones, PDAs (personal digital assistants) or dedicated electronic games), that do not incorporated such expensive power consuming processors. Even if such devices were to incorporate such processors, they would not have the battery storage capacity to run such 3D graphics processing tasks for any significant amount of time. Accordingly, there is an industry perceived need for 3D graphics processing in such portable electronic devices that will not substantially raise the cost or power consumption requirements of such devices.

Conventionally, battery powered electronic devices have utilized low power analog or digital processing systems to perform signal processing functions. Analog signal processors, though typically capable of supporting higher throughput rates, are generally limited in terms of their long term accuracy and the complexity of the functions that they can perform. In addition, analog signal processing systems are typically quite inflexible once constructed and, therefore, best suited only to singular application anticipated in their initial design.

A digital signal processor provides the opportunity for enhanced accuracy and flexibility in the performance of operations that are very difficult, if not impracticably complex, to perform in an analog system. Additionally, digital signal processor systems typically offer a greater degree of post-construction flexibility than their analog counterparts, thereby permitting more functionally extensive modifications to be made for subsequent utilization in a wider variety of applications. Consequently, digital signal processing is preferred in many applications.

As the complexity of some processing operations have increased, the cooperative use of two or more processors has been designed into some of the portable electronic devices. Several processors operating in parallel on different tasks make it possible to increase the overall processing power. The application is shared among the various processors, which must exchange information. The means of exchange generally consists of a serial link or a communication memory. Once such scheme is represented in FIG. 1. FIG. 1 discloses a dual-processor scheme comprising a first processor 12—in this case a digital signal processor "DSP" (such as a TI-DSP #C54x)—coupled to a second processor 14 (such as an ARM TMS470{?} processor)—in this case a protocol processor. The core 18 of the DSP 12 is coupled to the core 20 of protocol processor 14 by a synchronizing circuit 16. The DSP 12 further includes a program ROM memory 22 and a local RAM memory 24. Processor 14 includes a program ROM memory 26 and a local RAM memory 28. The local RAM memories 24 and 28 of the DSP 12 and the processor 14 are coupled by a common DPRAM memory 30 with dual port. The synchronizing of the processes P1 and P2 is performed by a test and set instruction TAS which, as indicated in FIG. 2, makes it possible to ensure that a single processor utilizes the memory 30 (or memory zone) at any moment.

There also exist other process synchronizing mechanisms. For example, with the TAS instruction of FIG. 2, the program P1 writes parameters for the program P2 to the DPRAM memory 30. Since the parameters are related, if P2 accesses the memory 30 during modification by P1, there is a risk of error. The program P1 tests, with the TAS instruction, whether the memory 30 is available and generates an occupied signal. During modification of the parameters a, b, c, and d which are in the memory 30, if the program P2 requests access to this memory zone, its TAS instruction returns an occupied signal to it. The program P1 frees the memory 30 at the end of access and the program P2 can then access the memory if it makes a new request.

As FIG. 1 shows, each processor has its own ROM program memory 22, 26 respectively, a local work memory 24, 28 and a processor core 18, 20. The synchronizing means 16 and the DPRAM 30 are common to both processors. The overall diagram of processor 14 is represented in FIG. 3. The processor includes a processor proper 32 connected to a program memory 34 by an address bus 36 and an instruction bus 38. It is connected at data-stream level to a main processor 40 across a communication RAM memory 42 connected to each of the processors by a data bus 44, 46 and corresponding address bus 48, 50. The processor 32 can also be connected by data buses and selection and address buses 54, 56 to a hard-wired logic block 52 permitting the shaping of signals for a particular processing which would be too costly to carry out by means of the protocol processor 32. The logic block 52 is moreover connected to the processor 32 by an interrupt line 58.

Figure 5:
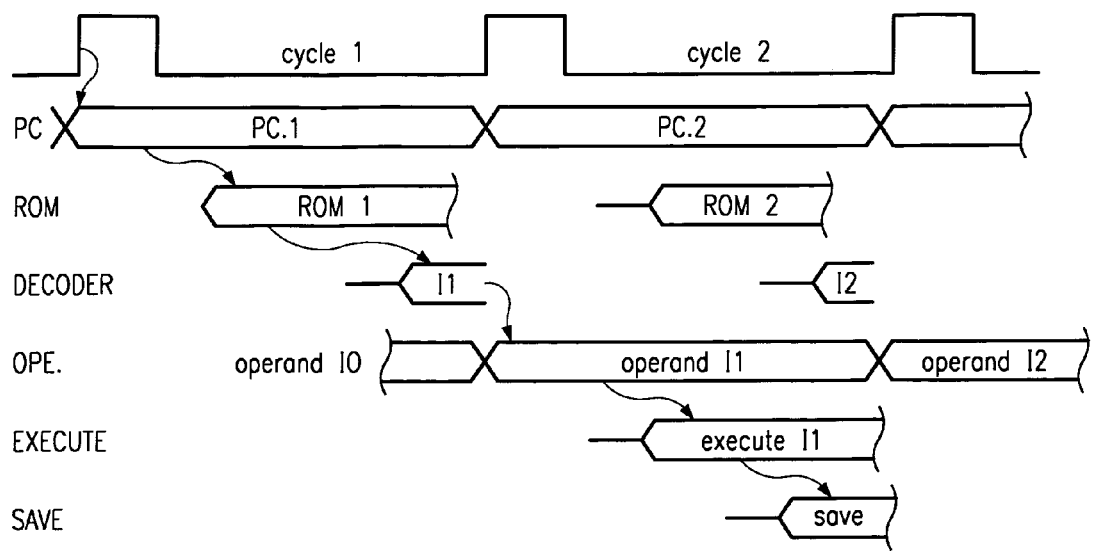
FIG. 5 is a chart representing signals at diverse points of processor 14 of FIG. 4.

FIG. 4 shows in more detail the protocol processor, which in fact comprises three parts. A program part denoted with the general reference numeral 60 contains an incrementation register 62 which is incremented with each cycle except when an immediate value PMA is loaded by way of a bus 64. The register 62 generates the address of a memory in the shape of a program 66 which itself generates an instruction on a bus 68. The processor further comprises a decoder part denoted by the general reference numeral 70 which receives the code of the instruction from the program ROM memory 66. This instruction is executed in two cycles in pipeline mode as the diagram of FIG. 5 shows.

During the cycle 1 indicated in this figure, the program memory 66 is read at the address PC1 of the incrementation register 62. At the end of the cycle, the instruction I1 delivered by the program memory 60 is decoded. During cycle 2, the operators of the instruction are read at the addresses specified by the code and the data part 72 which supplements the processor and which will subsequently be described executes the instruction. The result is stored at the address specified by the code of the instruction at the end of cycle 2. During cycle 2, the decoder 74 of the decoding part executes the same process on the instruction I2 situated at the address PC2 of the register 62.

With each cycle the decoder generates, on the bus 76, the address of the register used in the instruction and/or a RAM memory address on the bus 78. The decoder 74 which also plays the role of monitoring device receives from both sides interrupt signals and test and set signals TAS which are intended for synchronization. The data part 72 of the processor consists of a bank of registers 80 connected to two multiplexors MUX A and MUX B 82 and 84, intended for selecting the various registers or the RAM memories at the input of an arithmetic and logic and shift unit 86. The operation defined in the field of the instruction is executed between the two values at the inputs A and B of the arithmetic and logic values at the inputs A and B of the arithmetic and logic and shift unit 86 and the result is carried within the same cycle to the destination address. This destination address is embodied in the diagram of FIG. 4 by a dual-port memory 88 which is common to the protocol processor and to the main processing unit CPU 90 with which it is associated. The memory 88 is connected to the CPU 90 by means of a data and address bus 92, 94.

One example of a protocol processor 14 is the ARM 7X processor. The ARM processor performs co-processor "data operations", "data transfers", and "register transfers". The processor utilizes a condition field, a co-processor operation code on four-bits, co-processor operand register, destination, and co-processor number to identify it—three bits. The total instruction size of the ARM 7X processor is sufficient to support eight co-processors and sixteen op-codes. There is also a co-processor information and co-processor operand register—two operand registers and one destination. As an example, the ARM device may send an instruction to the processor, such as "start this task". The instruction is typically multi-cycle. The instruction has all the synchronization signals to load the co-processor (DSP 12 in this case), to take the communication bus, do its computation, compute any resulting value and then send any information to the ARM—e.g., saying that the value is ready. There is a minimum cost to be able to run the interface (values s & v). So, "s" is the time to do the operation and "v" is the number of cycles spent in the co-processor busy wait. There is also a recovery time from the busy wait. As a result, there is a penalty to use it.

In portable electronic devices that utilize the processing scheme of FIGS. 1-5, there is a protocol processor (ARM (7x) in this case) in which any change within the co-processor (DSP 12 in this case), in terms of data (via a bus, an instruction, and so forth), requires that the protocol processor use a memory bus and a RAM. First, processing within the co-processor (CDP) is performed. Next, a register to register transfer (MCR) is performed, after which there is a transfer of the (LDC/STC)—three cycles in all. Throughout all of this, the co-processor (DSP) does not see the resources inside the protocol processor (ARM 7X). While the co-processor (DSP 12) has its own set of resources that allows it to perform some processing on its own, everything that relates to talking to the environment of the protocol processor (ARM 7X)—i.e., software, the bus, the RAM, etc., is under control of the protocol processor (ARM 7X) with specific instructions and adds additional cycles to the time needed to perform multiple operations.

While the DSP in the above RISC/DSP combination superbly performs many processing operations, it is well known that current generation DSPs do not perform high-speed division operations in an efficient manner. 3D graphics imaging processing benefits from efficient multiply and accumulates (MACs) as well as division operations execution. Unfortunately, the rasterization operation of the desired 3D graphics imaging processing is high-speed division intensive. The present invention discloses an apparatus and method for enabling a processor (in this case a DSP) to perform high-speed division operations, as set forth below.

Figure 6:
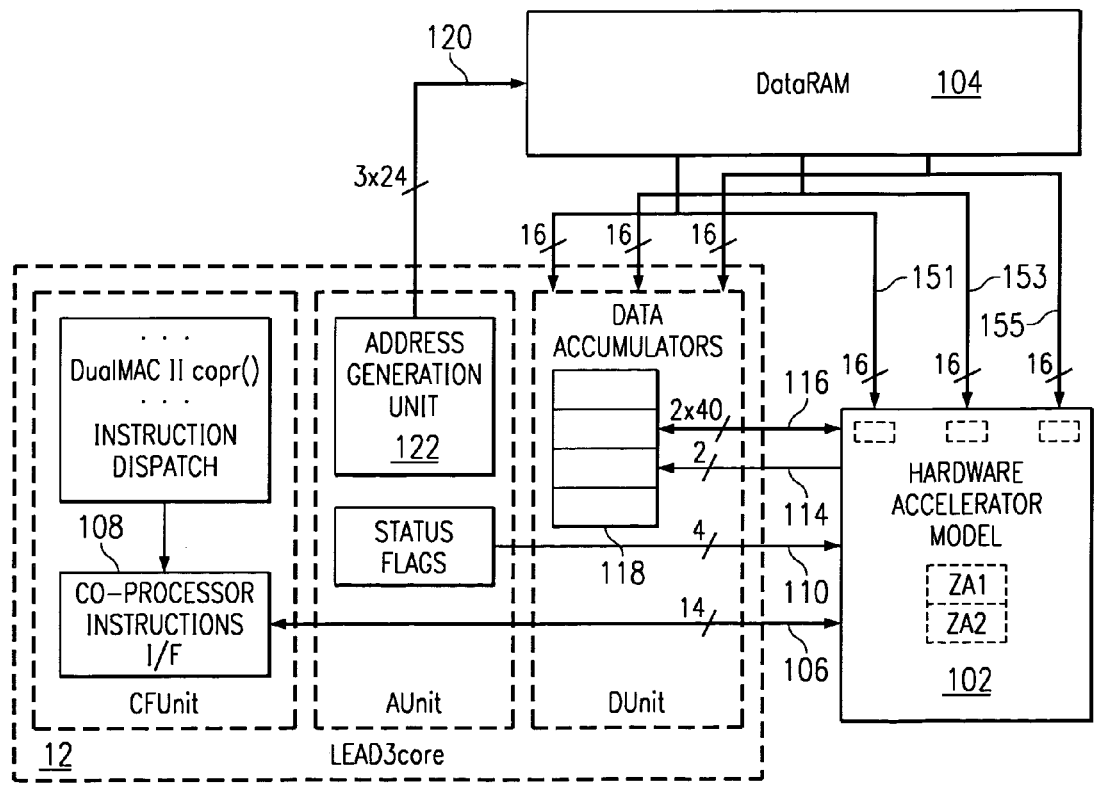
FIG. 6 is a block diagram of a data processing system according to one embodiment of the invention.

FIG. 6 illustrates an apparatus in which a hardware accelerator 102 couples a processor 12 (a TI-DSP C55X, according to a preferred embodiment of the invention) to a data RAM 104, in a scheme that improves processing efficiency over that available in the prior art, according to one embodiment of the invention. Sixteen bit data buses 151, 153 and 155. couple hardware accelerator 102 to random access memory "RAM" 104 and to data accumulators 118. A thirteen-bit data bus 106 couples hardware accelerator 102 to co-processor instructions I/F 108 of processor 12. A four-bit data bus 110 couples hardware accelerator 102 to status flags 112 of processor 12. A two-bit data bus 114 and a 2×40 bit data bus 116 couple hardware accelerator 102 to data accumulator 118 and a 3×16 bit address bus 120 couples address generation unit 122 to RAM 104. A pin list of the module and meaning is shown in table 1.

TABLE 1

| Pin name | Function | Direction | size |
|---|---|---|---|
| clk: | System clock | IN | 1 |
| bbus: | data read using B pointer in RAM (coeff) | IN | 16 |
| cbus: | data read using C pointer in RAM (Xmem) | IN | 16 |
| dbus: | data read using D pointer in RAM (Ymem) | IN | 16 |
| ACxr: | ACx data read | IN | 40 |
| ACxw: | ACx data write | OUT | 40 |
| ACxz: | ACz zero | OUT | 1 |
| ACyr: | ACy data read | IN | 40 |
| ACyw: | ACy data write | OUT | 40 |
| ACyz: | ACy zero | OUT | 1 |
| HWStatus: | M40, RDM, SATD and SXMD flags | IN | 4 |
| HWinst: | Hardware accelerator instruction | IN | 8 |
| HWstrobe: | Hardware accelerator instruction strobe | IN | 1 |
| Hwbshaden: | Update of HWA's B bus shadow | IN | 1 |
| Hwcshaden: | Update of HWA's C bus shadow | IN | 1 |
| Hwdshaden: | Update of HWA's D bus shadow | IN | 1 |
| HWstallw: | Stall due to data write in the pipeline | IN | 1 |
| HWerror: | Hardware accelerator error to CPU | OUT | 1 |

Figure 7:
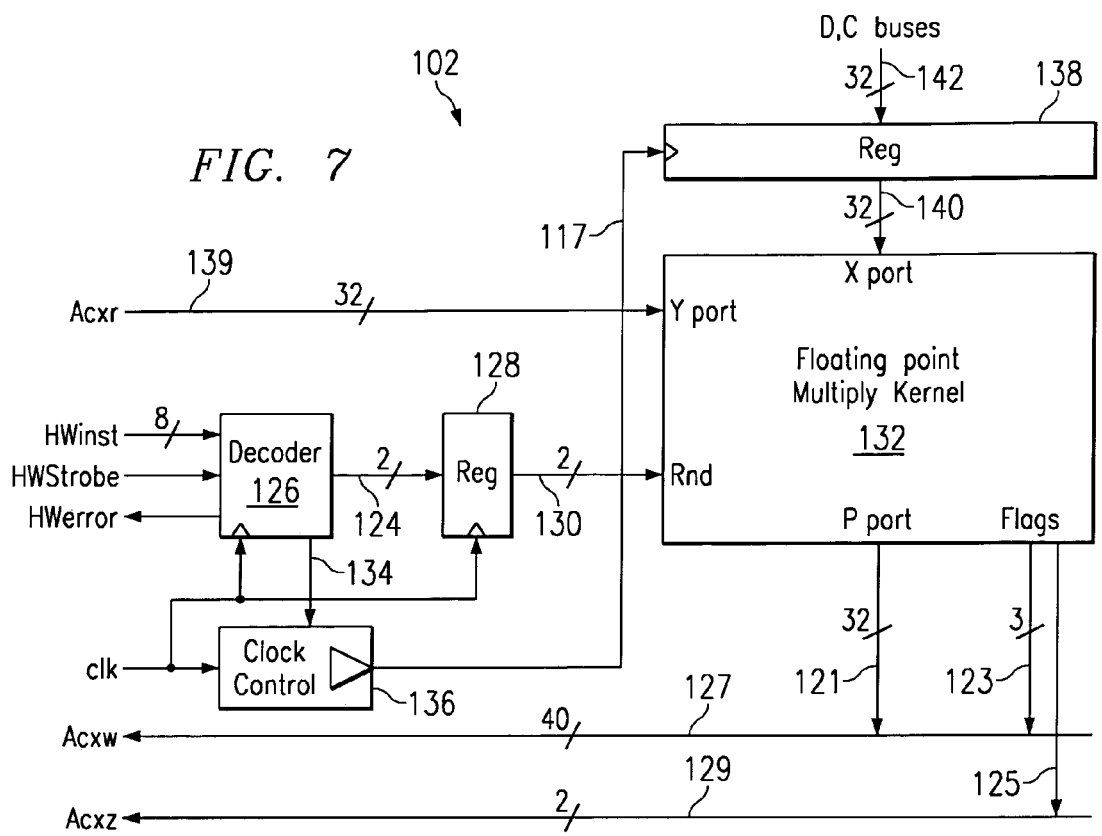
FIG. 7 is a schematic diagram of hardware accelerator 102 of FIG. 6, according to one embodiment of the invention.

FIG. 7 is a block diagram of hardware accelerator 102, according to one embodiment of the invention. Bus 124 couples decoder 126 to register 128. Bus 130 couples register 128 to the Rnd input of floating point multiply kernel 132. A lead line 134 couples decoder 126 to clock control 136. A lead line 117 couples clock control 136 to register 138. A bus 140 couples register 138 to the X port of floating point multiply kernel 132. A bus 142 couples register 138 to the D and C buses (not shown). The Y port of floating point multiply kernel 132 is coupled to bus 13 (ACxr). The P port of floating point multiply kernel 132 is coupled to bus 121, which is coupled to bus 127 (ACxw). One Flag output of floating point multiply kernel 132 is coupled to bus 123, which is coupled to bus 127, and another Flag output of floating point multiply kernel 132 is coupled to a signal line 125, which is coupled to bus 129 (ACxz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 8:
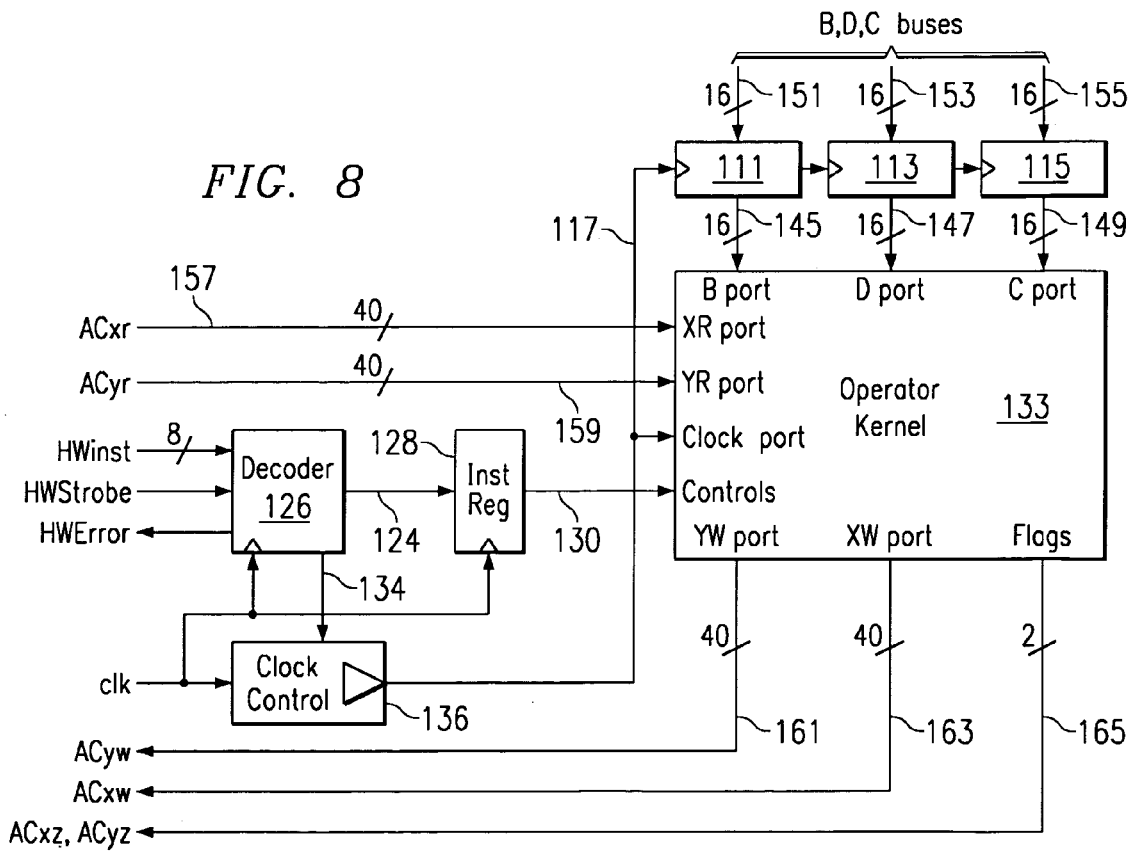
FIG. 8 is a block diagram of hardware accelerator 102, according to another embodiment of the invention in which the data flow mode is [Acx,ACy]=copr(Acx,ACy,Xmem,Ymem,Coef).

FIG. 8 is a block diagram of hardware accelerator 102, according to another embodiment of the invention in which the data flow mode is [Acx,ACy]=copr(Acx,ACy,Xmem,Ymem,Coef). Bus 124 couples decoder 126 to register 128. Bus 130 couples register 128 to operator kernel 133. A lead line 134 couples decoder 126 to clock control 136. A lead line 117 couples clock control 136 to register 139 and to the clock port of operator kernel 133. A bus 145 couples register 111 to the B port of operator kernel 133. A bus 147 couples register 113 to the D port of operator kernel 133. A bus 149 couples register 115 to the C port of operator kernel 133. Register 111 is coupled to bus 151 (B bus), register 113 is coupled to bus 153 (D bus), register 115 is coupled to bus 155 (C bus) and registers 111, 113 and 115 are also coupled to each other. The XR port of operator kernel 133 is coupled to bus 157 (ACxr). The YR port of bus operator kernel 133 is coupled to bus 159 (ACyr). The YW port of operator kernel 133 is coupled to bus 161 (ACyw). The XW port of operator kernel 133 is coupled to bus 163 (ACxw). The flags output of operator kernel 133 is coupled to bus 165 (ACxz, ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 9:
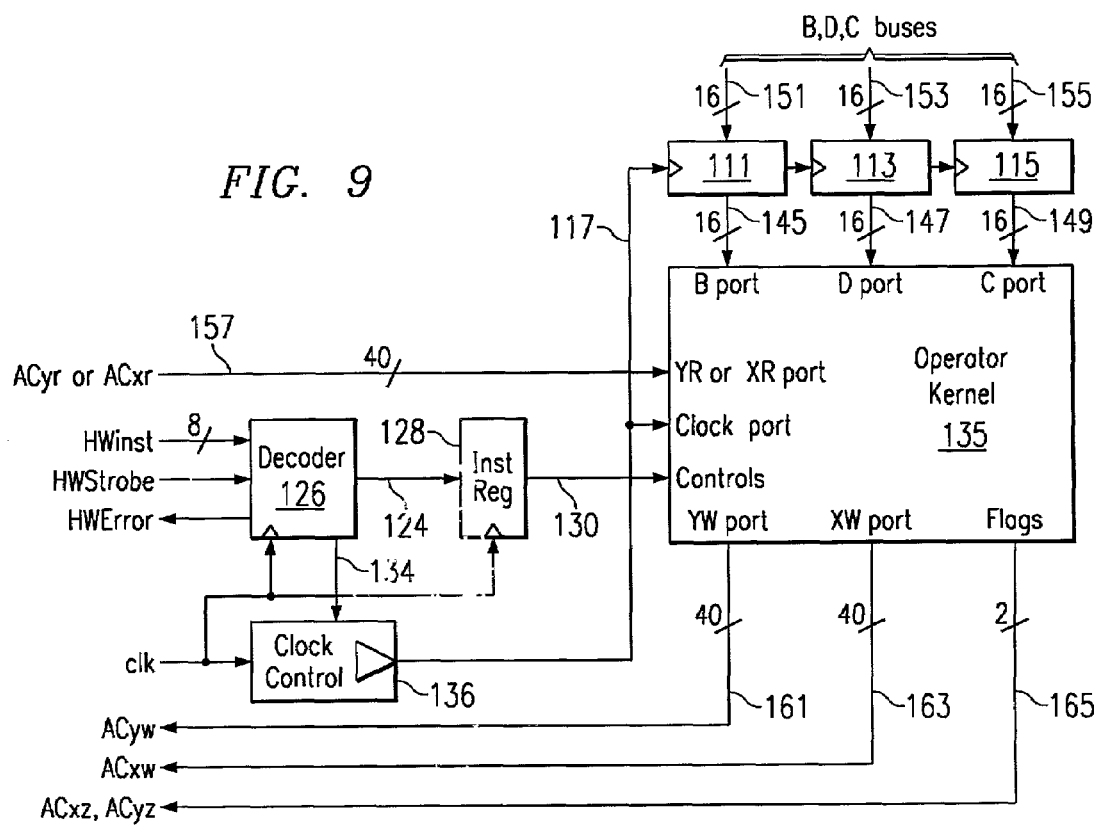
FIG. 9 is a block diagram of hardware accelerator 102, according to another embodiment of the invention in which the data flow mode are [Acx,ACy]=copr(ACy,Xmem,Ymem,Coef) or [Acx,ACy]=copr(Acx,Xmem,Ymem,Coef).

FIG. 9 is a block diagram of hardware accelerator 102, according to another embodiment of the invention in which the data flow mode are [Acx,ACy]=copr(ACy,Xmem,Ymem,Coef) or [Acx,ACy]=copr(Acx,Xmem,Ymem,Coef). Bus 124 couples decoder 126 to register 128. Bus 130 couples register 128 to operator kernel 135. A lead line 134 couples decoder 126 to clock control 136. A lead line 117 couples clock control 136 to register 111 and to the clock port of operator kernel 135. A bus 145 couples register 111 to the B port of operator kernel 135. A bus 147 couples register 113 to the D port of operator kernel 135. A bus 149 couples register 115 to the C port of operator kernel 135. Register 111 is coupled to bus 151 (B bus), register 113 is coupled to bus 153 (D bus), register 115 is coupled to bus 155 (C bus) and registers 111, 113 and 115 are also coupled to each other. One of a YR port or an XR port is coupled to bus 157 (ACyr in the case of YR port and ACxr in the case of XR port). The YW port of operator kernel 135 is coupled to bus 161 (ACyw). The XW port of operator kernel 135 is coupled to bus 163 (ACxw). The flags output of operator kernel 135 is coupled to bus 165 (ACxz, ACys). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 10:
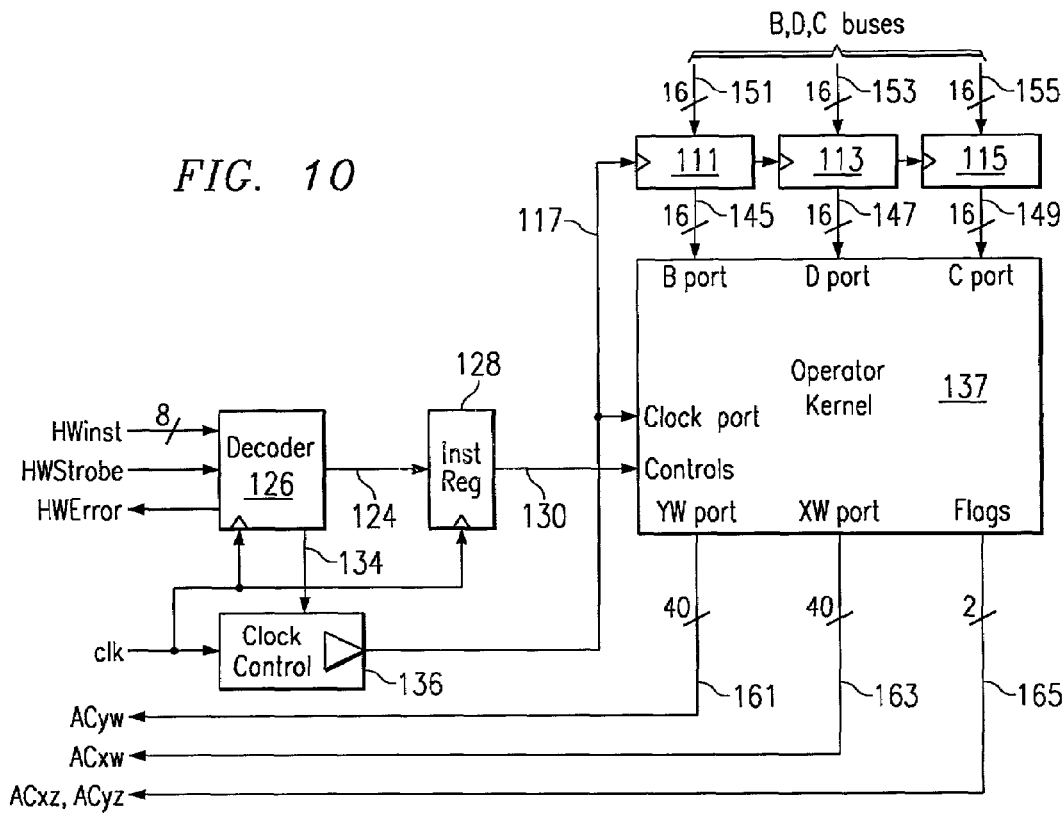
FIG. 10 is a block diagram of hardware accelerator 102, according to yet another embodiment of the invention in which the dataflow mode is [Acx,ACy]=copr(Xmem,Ymem,Coef).

FIG. 10 is a block diagram of hardware accelerator 102, according to yet another embodiment of the invention in which the dataflow mode is [Acx,ACy]=copr(Xmem,Ymem,Coef). Bus 124 couples decoder 126 to register 128. Bus 130 couples register 128 to operator kernel 137. A lead line 134 couples decoder 126 to clock control 136. A lead line 117 couples clock control 136 to register 139 and to the clock port of operator kernel 137. A bus 145 couples register 139 to the B port of operator kernel 135. A bus 147 couples register 141 to the D port of operator kernel 137. A bus 149 couples register 143 to the C port of operator kernel 135. Register 111 is coupled to bus 151 (B bus), register 113 is coupled to bus 153 (D bus), register 115 is coupled to bus 155 (C bus) and registers 111, 113 and 115 are also coupled to each other. One of a YR port or an XR port of operator kernel 137 is coupled to bus 157 (ACyr in the case of YR port and ACxr in the case of XR port). The YW port of operator kernel 137 is coupled to bus 161 (ACyw). The XW port of operator kernel 137 is coupled to bus 163 (ACxw). The flags output of operator kernel 137 is coupled to bus 165 (ACxz, ACys). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 11:
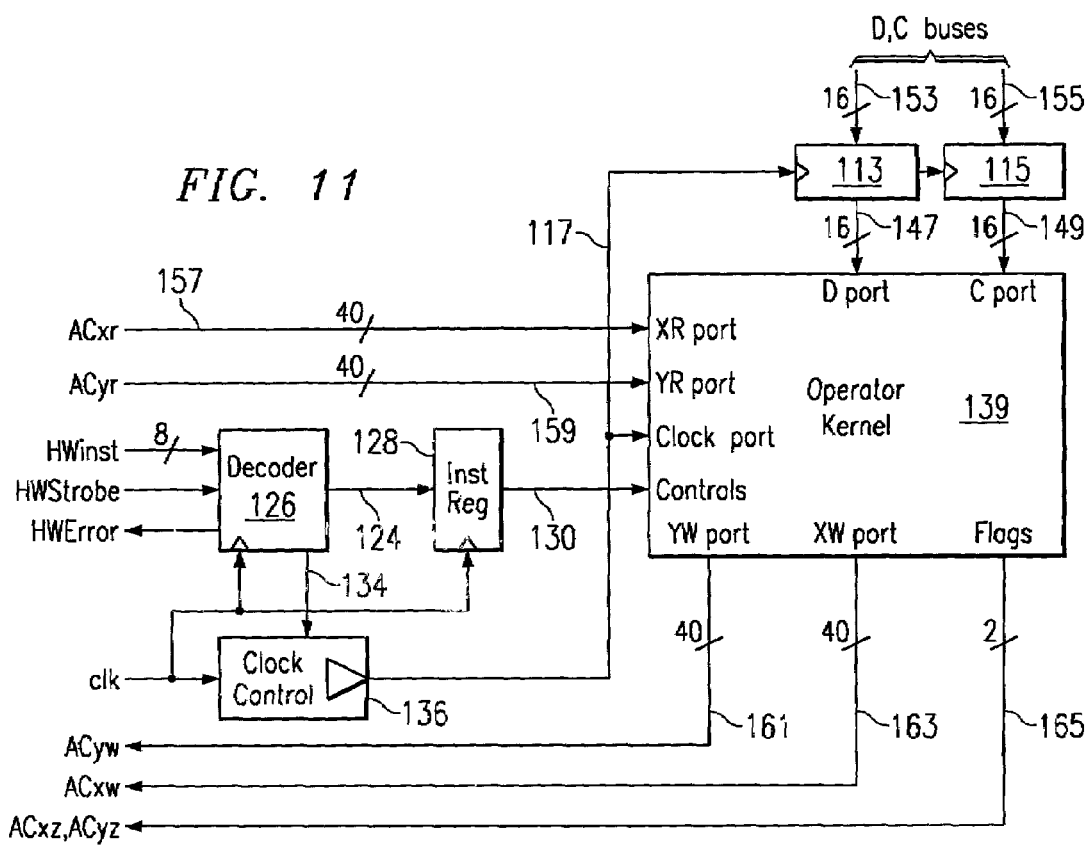
FIG. 11 is a block diagram of hardware accelerator 102, according to still yet another embodiment of the invention in which the dataflow mode is [Acx,ACy]=copr(Acx,ACy, Xmem,Ymem). Bus 124 couples decoder 126 to register 128.

FIG. 11 is a block diagram of hardware accelerator 102, according to still yet another embodiment of the invention in which the dataflow mode is [Acx,ACy]=copr(Acx,ACy,Xmem,Ymem). Bus 124 couples decoder 126 to register 128. Bus 130 couples register 128 to operator kernel 139. A lead line 134 couples decoder 126 to clock control 136. A lead line 117 couples clock control 136 to register 141 and to the clock port of operator kernel 139. A bus 147 couples register 141 to the D port of operator kernel 139. A bus 149 couples register 143 to the C port of operator kernel 139. Register 113 is coupled to bus 153 (D bus), register 115 is coupled to bus 155 (C bus) and registers 113 and 115 are also coupled to each other. The XR port of operator kernel 139 is coupled to bus 157 (ACxr). The YR port of bus operator kernel 139 is coupled to bus 159 (ACyr). The YW port of operator kernel 139 is coupled to bus 161 (ACyw). The XW port of operator kernel 139 is coupled to bus 163 (ACxw). The flags output of operator kernel 139 is coupled to bus 165 (ACxz, ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 12:
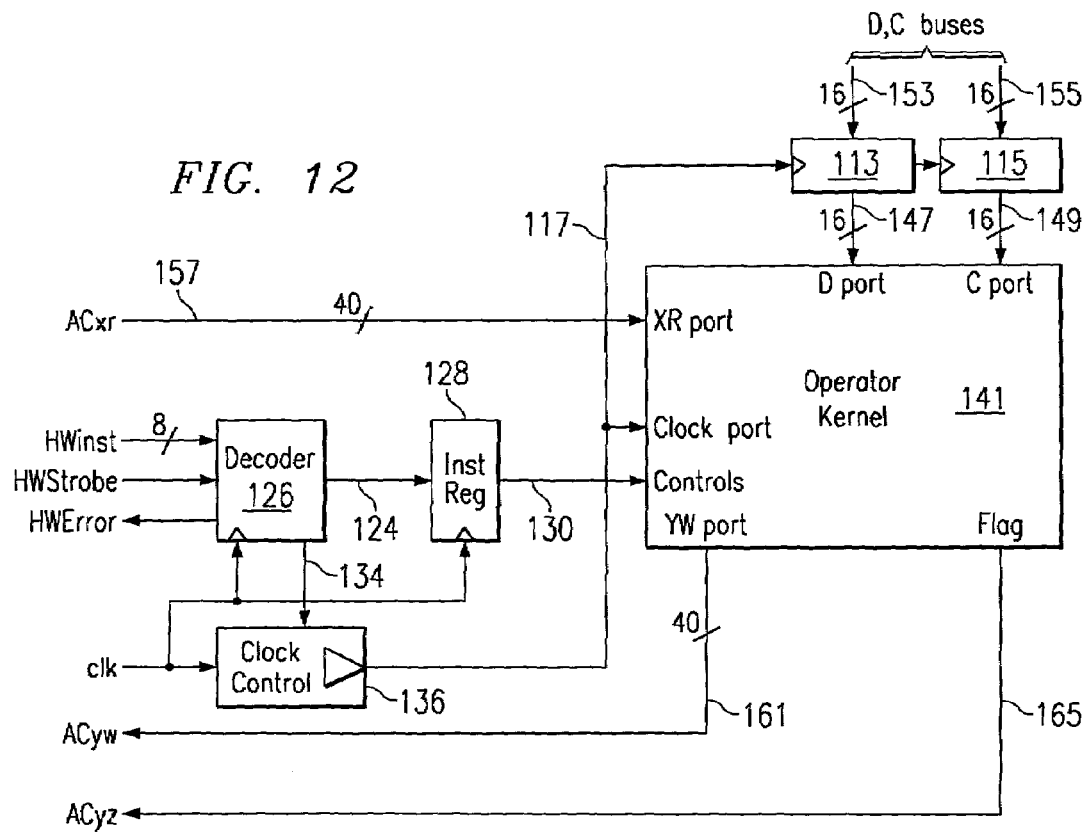
FIG. 12 is a block diagram of hardware accelerator 102, according to another embodiment of the invention in which dataflow mode is ACy=copr(Acx,Xmem,Ymem) or ACy=copr(Acx,Lmem).

FIG. 12 is a block diagram of hardware accelerator 102, according to another embodiment of the invention in which dataflow mode is ACy=copr(Acx,Xmem,Ymem) or ACy=copr(Acx,Lmem). Bus 124 couples decoder 126 to register 128. Bus 130 couples register 128 to operator kernel 141. A lead line 134 couples decoder 126 to clock control 136. A lead line 117 couples clock control 136 to register 113 and to the clock port of operator kernel 141. A bus 147 couples register 113 to the D port of operator kernel 141. A bus 149 couples register 115 to the C port of operator kernel 141. Register 113 is coupled to bus 153 (D bus), register 115 is coupled to bus 155 (C bus) and registers 113 and 115 are also coupled to each other. The XR port of operator kernel 141 is coupled to bus 157 (ACxr). The YW port of operator kernel 141 is coupled to bus 161 (ACyw). The flag output of operator kernel 141 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 13:
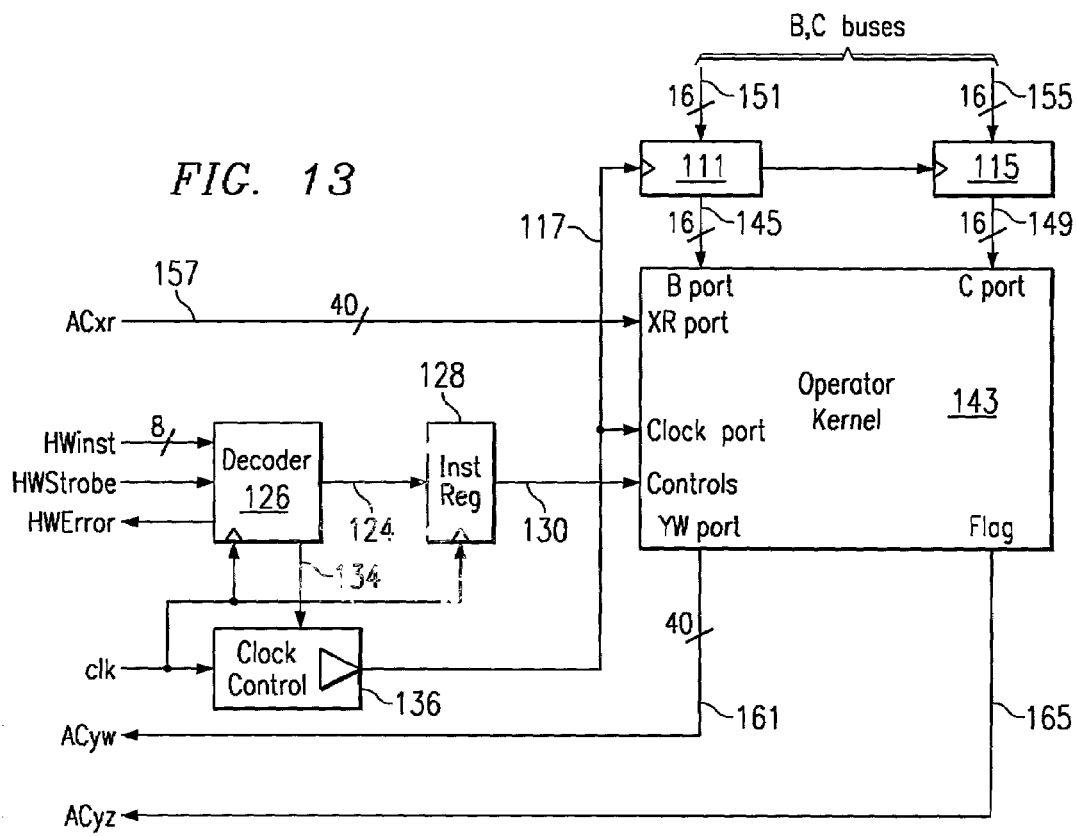
FIG. 13 is a block diagram of hardware accelerator 102, according to yet another embodiment of the invention in which the draftflow mode is ACy=copr(Acx,Ymem,Coef).

FIG. 13 is a block diagram of hardware accelerator 102, according to yet another embodiment of the invention in which the dataflow mode is ACy=copr(Acx,Ymem,Coef). Bus 124 couples decoder 126 to register 128. Bus 130 couples register 128 to operator kernel 143. A lead line 134 couples decoder 126 to clock control 136. A lead line 117 couples clock control 136 to register 111 and to the clock port of operator kernel 143. A bus 145 couples register 11 to the B port of operator kernel 143. A bus 149 couples register 115 to the C port of operator kernel 143. Register 111 is coupled to bus 151 (B bus), register 115 is coupled to bus 155 (DC bus) and registers 111 and 115 are also coupled to each other. The XR port of operator kernel 141 is coupled to bus 157 (ACxr). The YW port of operator kernel 143 is coupled to bus 161 (ACyw). The flag output of operator kernel 143 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 14:
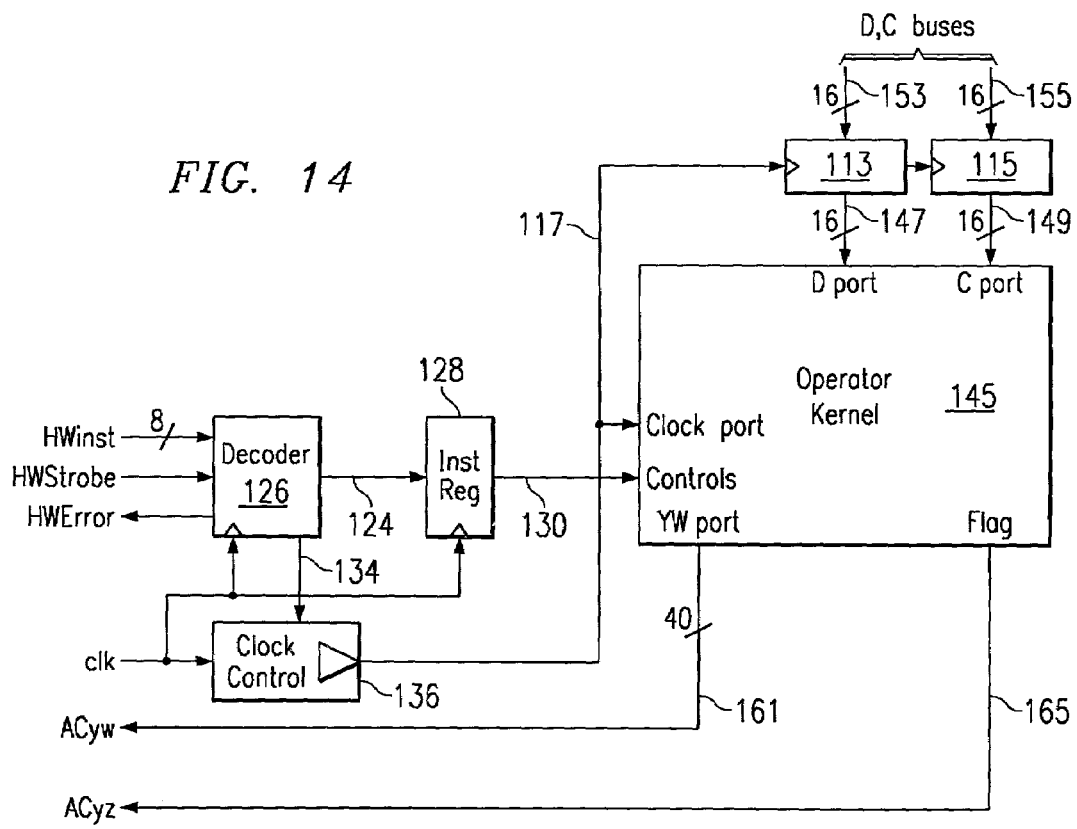
FIG. 14 is a block diagram of hardware accelerator 102, according to still yet another embodiment of the invention in which the dataflow mode is ACy=copr(Ymem,Coef).

FIG. 14 is a block diagram of hardware accelerator 102, according to still yet another embodiment of the invention in which the dataflow mode is ACy=copr(Ymem,Coef). Bus 124 couples decoder 126 to register 128. Bus 130 couples register 128 to operator kernel 145. A lead line 134 couples decoder 126 to clock control 136. A lead line 117 couples clock control 136 to register 113 and to the clock port of operator kernel 145. A bus 147 couples register 113 to the D port of operator kernel 145. A bus 149 couples register 115 to the C port of operator kernel 145. Register 113 is coupled to bus 153 (D bus), register 115 is coupled to bus 155 (C bus) and registers 113 and 115 are also coupled to each other. The YW port of operator kernel 145 is coupled to bus 161 (ACyw). The flag output of operator kernel 145 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 15:
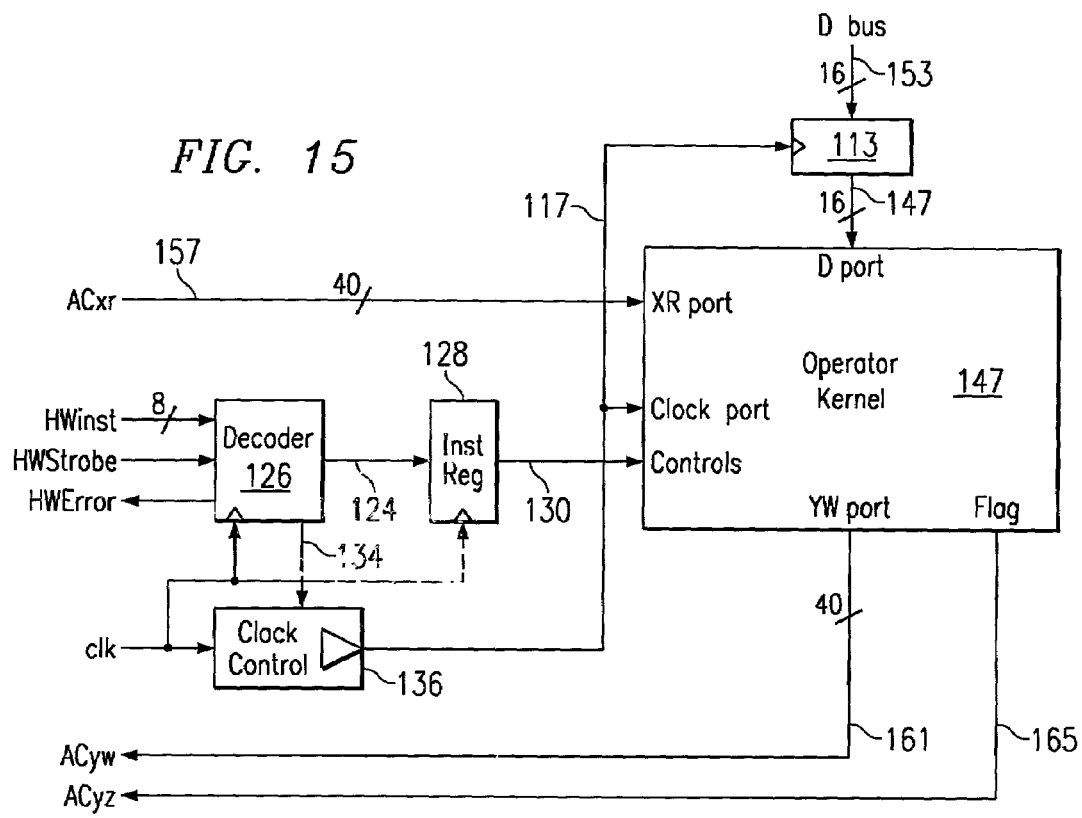
FIG. 15 is a block diagram of hardware accelerator 102, according to yet another embodiment of the invention in which the dataflow mode is ACy=copr(Acx,Smem).

FIG. 15 is a block diagram of hardware accelerator 102, according to yet another embodiment of the invention in which the dataflow mode is ACy=copr(Acx,Smem). Bus 124 couples decoder 126 to register 128. Bus 130 couples register 128 to operator kernel 147. A lead line 134 couples decoder 126 to clock control 136. A lead line 117 couples clock control 136 to register 113 and to the clock port of operator kernel 147. A bus 147 couples register 113 to the D port of operator kernel 147. Register 113 is also coupled to bus 153 (D bus). The XR port of operator kernel 147 is coupled to bus 157 (ACxr). The YW port of operator kernel 147 is coupled to bus 161 (ACyw). The flag output of operator kernel 147 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 16:
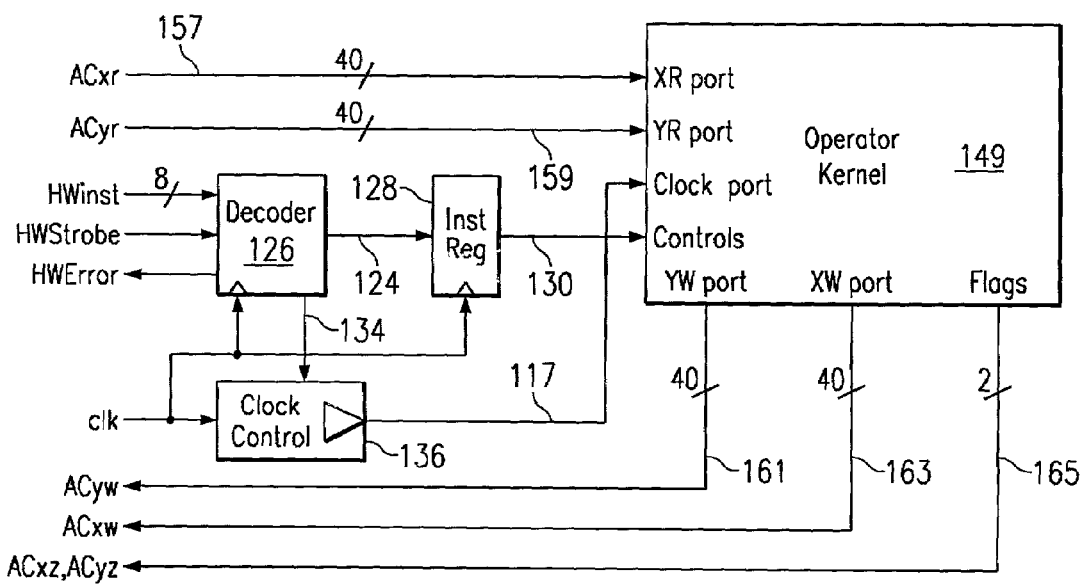
FIG. 16 is a block diagram of hardware accelerator 102, according to still yet another embodiment of the invention in which the dataflow mode is [Acx,ACy]=copr(Acx,ACy).

FIG. 16 is a block diagram of hardware accelerator 102, according to still yet another embodiment of the invention in which the dataflow mode is [Acx,ACy]=copr(Acx,ACy). Bus 124 couples decoder 126 to register 128. Bus 130 couples register 128 to operator kernel 149. A lead line 134 couples decoder 126 to clock control 136. A lead line 117 couples clock control 136 to the clock port of operator kernel 149. The XR port of operator kernel 149 is coupled to bus 157 (ACxr). The YR port of bus operator kernel 149 is coupled to bus 159 (ACyr). The YW port of operator kernel 149 is coupled to bus 161 (ACyw). The XW port of operator kernel 149 is coupled to bus 163 (ACxw). The flags output of operator kernel 149 is coupled to bus 165 (ACxz, ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 17:
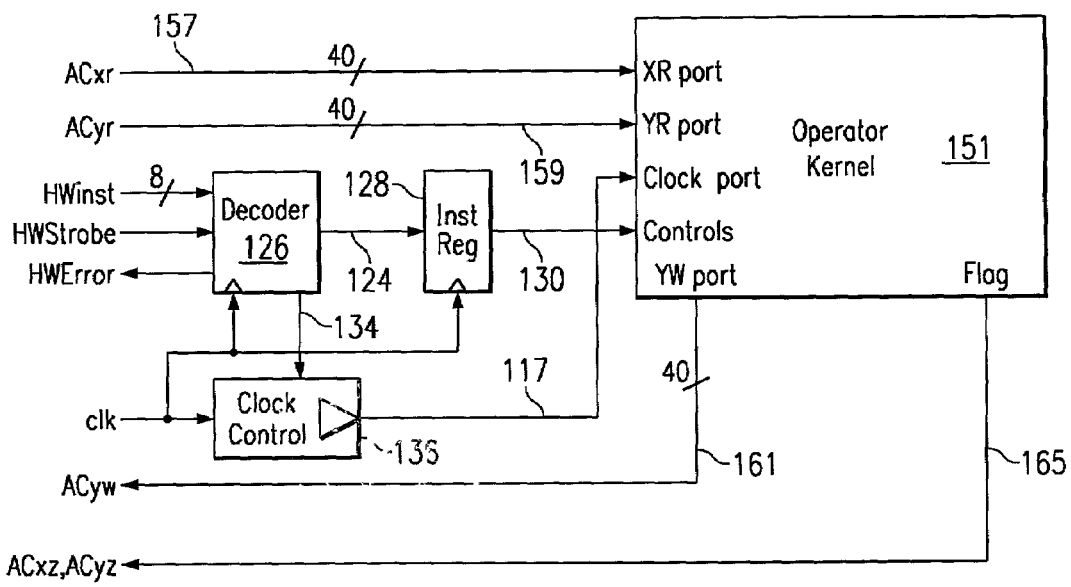
FIG. 17 is a block diagram of hardware accelerator 102, according to yet another embodiment of the invention in which the dataflow mode is ACy=copr(Acx,ACy).

FIG. 17 is a block diagram of hardware accelerator 102, according to yet another embodiment of the invention in which the dataflow mode is ACy=copr(Acx,ACy). Bus 124 couples decoder 126 to register 128. Bus 130 couples register 128 to operator kernel 151. A lead line 134 couples decoder 126 to clock control 136. A lead line 117 couples clock control 136 to the clock port of operator kernel 151. The XR port of operator kernel 151 is coupled to bus 157 (ACxr). The YR port of bus operator kernel 151 is coupled to bus 159 (ACyr). The YW port of operator kernel 151 is coupled to bus 161 (ACyw). The flag output of operator kernel 151 is coupled to bus 165 (ACxz, ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Moreover, any of the configurations of hardware accelerator 102 in drawing FIGS. 7-17 can also be mixed together to form a single hardware accelerator. No matter which hardware accelerator configuration is selected, a set of qualifiers in the instruction set of processor 12 (<<copr( )>>class) redefines the meaning of an instruction executing operations within the data processing unit (Dunit) of the DSP core. These instructions can include references that allow:

control for a dual access to data via two pointers,
control for a third data value from an other memory bank,
control of more data sources from accumulators,
control for destinations(s) of re-defined operation,
the controls for the new operation.

The <<copr( )>> qualifiers class consists of 4 parallelisable opcodes which allow to pass the 8-bit instruction field to the hardware accelerator 102 in different ways and allow store operations to happen in parallel of the hardware accelerator execution. All properties and opcodes format are summarized in Table 2 below:

TABLE 2

| Opcode syntax | Format | Comments |
|---|---|---|
| Copr(k6) | 16-bit | Merges "k6" field with some instruction fields to build hardware accelerator instruction.<br>No write from ACs in parallel of HWA execution. |
| copr( ) | 8-bit | HWA instruction field is built from fields of the qualified instruction.<br>No write from ACs in parallel of HWA execution. |
| Smem=Acx,copr( ) | 24-bit | Merges a 4-bit field from this qualifier to fields from the qualified instruction. Smem write from ACs allowed in parallel. |

TABLE 2-continued

| Opcode syntax | Format | Comments |
|---|---|---|
| Lmem=Acx,copr( ) | 24-bit | Merges a 4-bit field from this qualifier to fields from the qualified instruction. Lmem write from ACs allowed in parallel. |

Combining above qualifiers with D Unit instructions creates a set of dataflows that can be used by the hardware accelerator 102. They are summarized in the table below, which gives the number of hardware accelerators available per dataflow and the cost in bytes of the qualified pair. For the sake of implementation of the hardware connection to the core when multiple accelerators are present in an application, the hardware accelerator 102 instruction field is divided in 2 parts:

bits 7-6 indicate the number of the hardware accelerator (up to 8 can be connected),
bits 5-0 indicate the instruction code for the selected HWA (up to 32 instructions HWA).

When instruction fields exported to the hardware accelerator 102 cannot fill the upper 3 bits, then less than 8 hardware accelerators are available for such dataflow.

The dataflow mode describes the call to the hardware accelerator 102. The syntax used in below Table 3 utilizes the generic keyword "copr( )" as a short form of the qualified instruction and qualifier opcode pair. The built-in parallelism syntax (ex: ACy=copr(ACx), Smem=ACz) is used for Smem or Lmem writes that are allowed in parallel of the execution in the hardware accelerator 102.

TABLE 3

| HWA dataflow Modes | Number of Accelerators Available | Number of Instructions/ Accelerators | Instruction size/(cost of qualifier) |
|---|---|---|---|
| ACy=copr(ACx,ACy) | 8 | 32 | 4(+2) |
| ACy=copr(ACx,ACy), Smem=Acz | 4 | 32 | 5(+1) |
| ACy=copr(ACx,ACy), Lmem=Acz | 4 | 32 | 5(+0) |
| [ACx,Acy]=copr(ACx,ACy) | 8 | 32 | 5(+2) |
| [ACx,Acy]=copr(ACx,ACy), Smem=Acz | 8 | 32 | 6(+1) |
| [ACx,Acy]=copr(ACx,ACy), Lmem=Acz | 8 | 32 | 6(+0) |
| ACy=copr(Acx,Smem) | 8 | 32 | 5(+2) |
| ACy=copr(Acx,Smem), Smem=Acz | 2 | 32 | 6(+1) |
| ACy=copr(ACx,Lmem) | 8 | 32 | 5(+2) |
| ACy=copr(ACx,Lmem), Lmem=Acz | 2 | 32 | 6(+0) |
| ACy=copr(ACx,Xmem,Ymem) | 8 | 32 | 6(+2) |
| | 2 | 32 | 5(+1) |
| [ACx,Acy]=copr(ACx,ACy,Xmem,Ymem) | 8 | 32 | 6(+2) |
| ACx=copr(Ymem,Coef), mar(Xmem) | 8 | 32 | 6(+2) |
| ACx=copr(ACx,Ymem,Coef), mar(Xmem) | 8 | 32 | 6(+2) |
| [ACx,Acy]=copr(Xmem,Ymem,Coef) | 8 | 32 | 6(+2) |
| [ACx,Acy]=copr(ACx,Xmem,Ymem,Coef) | 8 | 32 | 6(+2) |
| [ACx,Acy]=copr(ACy,Xmem,Ymem,Coef) | 8 | 32 | 6(+2) |
| [ACx,Acy]=copr(ACx,ACy,Xmem,Ymem,Coef) | 8 | 32 | 6(+2) |
| | 3 | 32 | 5(+1) |

The control field of the hardware accelerator 102 may be extracted from dedicated locations of each qualified instruction. The concatenation of these bits creates a value which may be, itself, concatenated to bit fields coming from the qualifier, and which is used for external custom decoding. Tables 4-7 below describe the instruction formats and fields used to export this encoding (see Instruction Set User's guide for TI-DSP #C55x for more information).

TABLE 4

| Qualified instruction By copr(k6) | Instruction format (e = bit exported) | Dataflow mode |
|---|---|---|
| Max_diff(ACx,Acy,ACz,ACw) | OOOO OOOE SSDD oooo SSDD xxxx<br>OOOO OOOE SSDD oooo SSDD xxee<br>HWA inst=[eek6] (00 to FF) | [Acx,ACy]=<br>copr(ACx,ACy) |
| Sqdst(Xmem,Ymem,ACx,ACy) (1)<br>Abdst(Xmem,Ymem,ACx,ACy) (2) | OOOO OOOO XXXM MMYY YMMM DDDD ooox ppp%<br>OOOO OOOO XXXM MMYY YMMM DDDD ooox ppee<br>HWA inst=[eek6](1 00 to 7F, 2 80 to FF) | [Acx,ACy]=<br>copr(ACx,ACy,Xmem, Ymem) |
| ACy=rnd(Smem*Acx)<br>(,|DR3=Smem] is not validated) | OOOO OOOO AAAA AAAI SSDD ooU%<br>OOOO OOOO AAAA AAAI SSDD ooee<br>HWA inst=[eek6] (00 to FF) | ACy=copr(ACx,Smem) |

TABLE 5

| Qualified instruction By copr(k6) | Instruction format (e = bit exported) | Dataflow mode |
|---|---|---|
| ACy=ACx+dbl(Lmem) (1)<br>ACy=ACx−dbl(Lmem) (2) | OOOO OOOO AAAA AAAI SSDD ooox<br>OOOO OOOO AAAA AAAI SSDD ooee<br>HWA inst=[eek6](1 00 to 7F, 2 80 to FF) | ACy=copr(ACx,Lmem) |
| ACy=M40(rnd(ACx+uns(Xmem)*uns(Ymem))))<br>(,[DR3=Smem] is not validated) | OOOO OOOO XXXM MMYY YMMM SSDD ooog uuU%<br>OOOO OOOO XXXM MMYY YMMM SSDD ooog uuee<br>HWA inst=[eek6] (00 to FF) | ACy=<br>copr(ACx,Xmem,Ymem) |
| ACx=M40(rnd(uns[Xmem]*uns(coeff))),<br>ACy=M40(rnd(uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [Acx,ACy]=<br>copr(Xmem,Ymem,Coef) |
| ACx=M40(rnd(ACx+uns(Xmem)*uns(coeff))),<br>ACy=M40(rnd(uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,Xmens,Ymem, Coef) |
| ACx=M40(rnd(ACx−uns(Xmem)*uns(coef))),<br>ACy=M40(rnd(uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,Xmem,Ymem, Coef) |
| Mar(Xmem),<br>ACx=M40(rnd(uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | ACx=copr(Ymem,Coef),<br>mar(Xmem) |
| ACx=M40(rnd(ACx+uns(Xmem)*uns(coeff)),<br>ACy=M40(rnd(Acy+uns(Ymem)*uns(coeff)) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,ACy,Xmem, Ymem,Coef) |
| ACx=M40(rnd(ACx−uns(Xmem)*uns(coeff))),<br>ACy=M40(rnd(ACY+uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,ACy,Xmem, Ymem,Coef) |
| ACx=M40(rnd((ACx>>#16)+uns(Xmem)*uns(coeff))),<br>ACy=M40(rnd(ACy+uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,ACy,Xmem, Ymem,Coef) |
| Mar(Xmem),<br>ACx=M40(rnd(ACx+uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | ACx=<br>copr(ACx,Ymem,Coef),<br>mar(Xmem) |
| ACx=M40(rnd(uns(Xmem)*uns(coeff))),<br>ACy=M40(rnd((ACy>>#16)+uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACy,Xmem,Ymem, Coef) |
| ACx=M40(rnd((ACx>>#16)+uns(Xmem)*uns(coeff))),<br>ACy=M40(rnd((ACy>>#16)+uns(Ymem)*uns(coeff)) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,ACy,Xmem, Ymem,Coef) |
| ACx=M40(rnd(ACx>>uns(Xmem)*uns(coeff))),<br>ACy=M40(rnd((ACy>>#16)*uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,ACy,Xmem, Ymem,Coef) |
| Mar(Xmem),<br>ACx=M40(rnd((ACx>>#16)+uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | ACx=<br>copr(ACx,Ymem,Coef),<br>mar(Xmem) |
| ACx=M40(rnd(ACx−uns(Xmem)*uns(coeff)),<br>ACy=M40(rnd(ACy−uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | [ACx,ACy]=<br>copr(ACx,ACy,Xmem, Ymem,Coef) |
| Mar(Xmem),<br>ACx=M40(rnd(ACx+uns(Ymem)*uns(coeff))) | OOOO OOOO XXXM MMYY YMMM ooDD uuDD mmg%<br>OOOO OOOO XXXM MMYY YMMM ooDD uuDD mmee<br>HWA inst=[eek6] (00 to FF) | ACx=<br>copr(ACx,Ymem,Coef),<br>mar(Xmem) |

This is the table for "copr( )" qualifier:

TABLE 6

| Qualified instruction<br>By copr() | Instruction format<br>(e/w = bit exported/encoded) | Dataflow mode |
|---|---|---|
| ACx=M40(rnd(ACx+uns(Xmem)*uns(coeff))),<br>ACy=M40(rnd(ACy+uns(Ymem)*uns(coeff))) (1) | OOOO OOOO XXXM MMYY YMMM ooDD uuDD mmg%<br>OOOO OOww XXXM MMYY YMMM wwDD eeDD mmee | [ACx,ACy]=<br>copr(ACx,ACy,<br>Xmem,Ymem,Coef) |
| ACx=M40(rnd(ACx−uns(Xmem)*uns(coeff))),<br>ACy=M40(rnd(ACy+uns(Ymem)*uns(coeff))) (2)<br>ACx=M40(rnd((ACx>>#16)+uns(Xmem)*uns(coeff))),<br>ACy=M40(rnd(ACy+uns(Ymem)*uns(coeff))) (3)<br>ACx=M40(rnd((ACx>>#16)+uns(Xmem)*uns(coeff))),<br>ACy=M40(rnd((ACy>>#16)+uns(Ymem)*uns(coeff))) (4)<br>ACx=M40(rnd(ACx−uns(Xmem)*uns(coeff))),<br>ACy=M40(rnd((ACy>>#16)+uns(Ymem)*uns(coeff))) (5) | | |
| ACx=M40(rnd(ACx−uns(Xmem)*uns(coeff))),<br>ACy=M40(rnd(ACy−uns(Ymem)*uns(coeff)) (6)<br>ACy=M40(rnd(ACx+uns(Xmem)*uns(Ymem))))<br>(,[DR3=Smem] is not validated) (1) | HWA inst=[wwwweeee] (1 00 to 0F, 2 10 to 1F,<br>3 20 to 2F, 4 30 to 3F, 5 40 to 4F, 6 50 to 5F)<br>OOOO OOOO XXXM MMYY YMMM SSDD ooog uuU%<br>OOOO OOOO XXXM MMYY YMMM SSDD oeoe eeee | ACy=<br>copr(ACx,Xmem,<br>Ymem) |
| ACy=M40(rnd((ACx>>#16)+uns(Xmem)*uns(Ymem))))<br>(,[DR3=Smem] is not validated) (2) | HWA inst=[00eeeeee] (1 00 to 1F, 2 20 to 3F) | |

This is the table for "S(L)mem=ACx, copr( )" qualifiers (cccc field is coming from these qualifiers):

TABLE 7

| Qualified instruction<br>By S(L)mem=ACx, copr() | Instruction format<br>(e/w = bit exported/encoded) | Dataflow mode |
|---|---|---|
| ACy=rnd(ACx*ACx) (1)<br>ACy=saturate(rnd(ACx)) (2)<br>ACy=rnd(ACx) (3) | OOOO OOOE SSDD ooo%<br>OOOO OOOE SSDD wwwe<br>HWA inst=[wwweeeee](1 00 to 1F, 2 20 to 3F,<br>3 40 to 5F) | ACy=copr(ACx),<br>Smem=Acz<br>ACy=copr(ACx),<br>Lmem=Acz |
| ACy=rnd(ACy*ACx) (1)<br>ACy=rnd(ACy+ACx*ACx) (2)<br>ACy=rnd(ACy−ACx*ACx) (3)<br>ACy=rnd(ACy+|ACx|) (4)<br>Max_diff(ACx,ACy,Acz,ACw) | OOOO OOOO SSDD ooo%<br>OOOO OOOE SSDD wwwe<br>HWA inst=[wwweeeee](1 00 to 1F, 2 20 to 3F,<br>3 40 to 5F, 4 60 to 7F)<br>OOOO OOOE SSDD oooo SSDD xxxx<br>OOOO OOOE SSDD oooo SSDD eeee<br>HWA inst=[eeeecccc] (00 to FF) | ACy=copr(ACx,ACy),<br>Smem=Acz<br>ACy=copr(ACx,ACy),<br>Lmem=Acz<br>[ACx,ACy]=copr(ACx,Acy),<br>Smem=Acz<br>[ACx,ACy]=copr(ACx,Acy),<br>Lmem=ACz) |
| ACy=rnd(Smem*Acx)<br>(,[DR3=Smem] is not validated) | OOOO OOOO AAAA AAAI SSDD ooU%<br>OOOO OOOO AAAA AAAI SSDD ooee<br>HWA inst=[00eecccc] (00 to 3F) | ACy=copr(ACX,Smem),<br>Smem=Acz |
| ACy=ACx+dbl(Lmem) (1)<br>ACy=ACx−dbl(Lmem) (2) | OOOO OOOO AAAA AAAI SSDD ooox<br>OOOO OOOO AAAA AAAI SSDD ooee<br>HWA inst=[00eeccccc](1 00 to 1F, 2 20 to 3F) | ACy=copr(ACx,Lmem),<br>Lmem=Acz |

Some default decoding rules are also defined:
1) Any other instruction pair built with the "copr( )" class that is not in the tables above is rejected by the hardware and a "nop" is executed, instead.
2) Status bit update flow coming with the standalone D Unit instruction is disabled when this instruction is qualified by the "copr( )" class. The only exception to this rule is for zero flags. Update of these bits in destination accumulators is allowed from the hardware accelerator and they receive the content carried by the zero flags signals computed by the hardware accelerator.
3) Other fields than those used to build the HWA instruction are processed as defined on the standalone instruction. If some of the "e" or "w" fields above overlap with opcode fields, then these opcodes will be also used as for normal instruction process in the machine pipeline.

Figure 18:
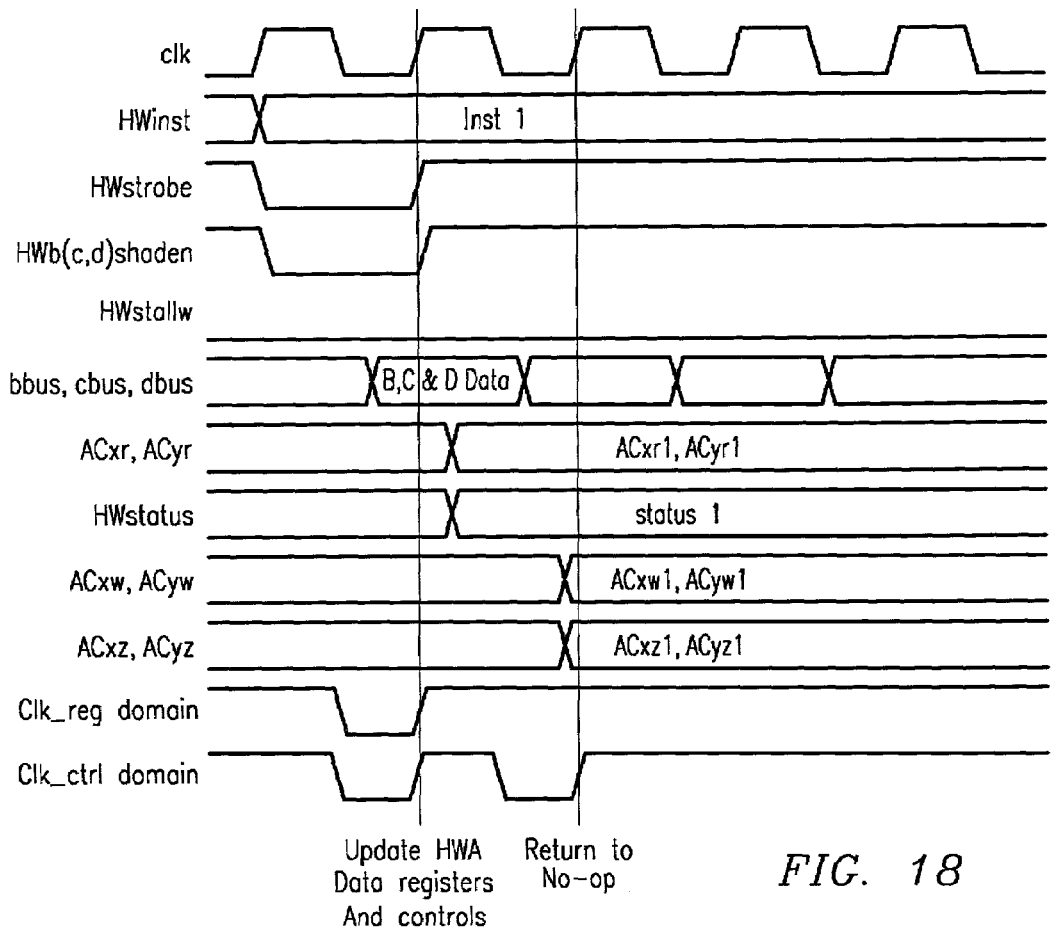
FIG. 18 is a timing diagram for a single cycle operation.

A timing diagram for a single-cycle operation is shown in FIG. 18. Input capacitance, output drive strength, delays from clock to outputs and slopes, input setup and hold time are characterized as part of the CPU timing extractions. Moreover, being that this invention anticipates that more than one hardware accelerator can be connected to this bus scheme, ACx[w,z] and ACy[w, z] can be tri-state signals. The Hardware accelerator that recognizes its instruction field will drive the bus at the end of the clock cycle.

Software View of the Hardware Accelerator:

In order to co-design software to use the hardware accelerator and its functional reference, the C model of processor 12 (TI-DSP #C55x) will provide templates and hooks to plug a view of the hardware. This will be performed by a function call associated with controls of "copr( )" and instruction dispatch decoding which operates in the Execute phase of the model pipeline. The function template will contain parameters definition and types. A user will have to provide the C code corresponding to hardware accelerator behavior. By default, when no accelerator is connected to the interface, the function returns 0 results on accumulator buses and corresponding zero flag is set to '1'.

In terms of software development, "copr( )" qualification can be supported by MACRO statements. Below is an example of such an approach:

```
MOTION_EST1 .macro
    AC0 = (*AR0+%) * (*CDP+%), AC1 = (*AR1+%Z) * (*CDP+%)||
    copr( )
.edm
MOTION_EST1 .macro
    AC2 = sat((*AR0+%) * (*CDP+%)), AC1 = sat((*AR1+%) *
    (*CDP+%) || copr( )
.endm
local repeat
    {
        CDP = AR T
        || repeat #16
            MOTION_EST1
        CDP = AR2
        || repeat #16
            MOTION_EST2
        mar(AR0+DR0) || mar(AR2+DR1)
        mar(AR1+DR0)
    }
```

Hardware View of the Hardware Accelerator:

The hardware accelerator appears in VHDL models of the CPU (functional and timing models). All the signals are characterized with respect to the "clk" clock, according to table below:

puting the distortions obtained by comparing a macroblock to a certain area of pixel in the reference image and repeating this operation for all macroblocks in the image from which motion has to be estimated. For h261 algorithm, the window around the macroblock extends by +/−15 pixels. For a single macroblock, computations consist of 256 distortions each built from 256 sums of absolute differences between a macroblock pixel and a reference window pixel. Pixels are coded on 8 bits (luminance) and distortions are coded on 16 bits.

Figure 19:
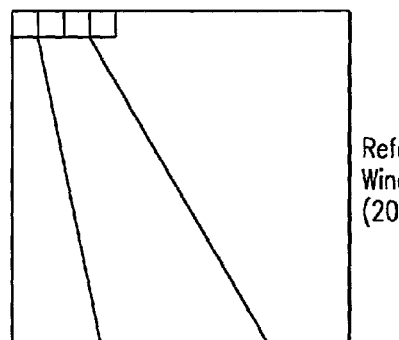
FIG. 19 illustrates a reference widow with 20×20 pixels.
Figure 20:
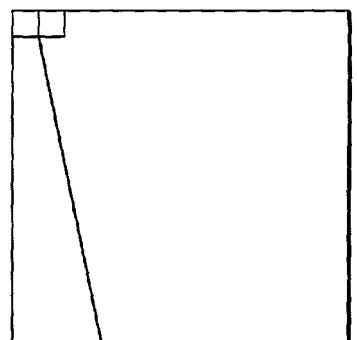
FIG. 20 illustrates a source macroblock with 16×16 pixels.

One way to decrease pure computation bandwidth at the image level is to apply a Hierarchical Full Search (HFS). This comprises generating, from the first image, sub-images derived by filtering in order to downsample by 2 on both directions the sub-image from the previous one. With 4 levels of sub-images, Full Search algorithm can be applied on a window which extends only by +/−two pixels around the macroblock (only 25 distortions are needed). This is the implementation chosen for the example. The hardware accelerator 102 will implement the basic computations to obtain the distortions. These will be stored in the accumulators (up to 4×2=8 distortions can fit). The search window is stored in a dual access memory bank. The macroblock of the reference image is stored in a Single access memory bank. Using the type 1 instructions re-defined by the copr( ) qualifier, it is possible to fetch, at each cycle, 2 pixels from the reference macroblock and 4 pixels from the search window. Thus, 3 distortions can be processed in parallel:

FIG. 19 illustrates a search window with 20×20 pixels, generally at 144. FIG. 20 illustrates a source macroblock with 16×16 pixels, generally at 146.

Operation mode 1:

ACxwmsbyte=abs(Dmsbyte-Bmsbyte)+abs(Dlsbyte-Blsbyte)+ACxmsbyte; ACxy=zero(ACxw), ACxs=0
ACxwlsbyte=abs(Dlsbyte-BmSbyte)+abs(Cmsbyte-Blsbyte)+ACexrlsbyte
ACywmsbyte=abs(Cmsbyte-Bmsbyte)=abs(Clsbyte-Blsbyte)+ACxrmsbyte; ACyz=zero(Acyw), ACys=0
ACywlsbyte=ACyrlsbyte
Estimated cost (modes 1 and 2): 3000 gates Operation mode 2:

ACxwmsbyte=abs(Dmsbyte-Bmsbyte)+abs(Dlsbyte-Blsbyte)+ACxmsbyte; ACxy=zero(ACxw), ACxs=0
ACxwlsbyte=abs(Dlsbyte-Bmsbyte)+abs(Cmsbyte-Blsbyte)+ACexrlsbyte
ACywlsbyte=abs(Cmsbyte-Bmsbyte)=abs(Clsbyte-Blsbyte)+ACxrlsbyte; ACyz=zero(ACyw), ACys=0
ACywmsbyte=ACyrmsbyte

TABLE 8

| bbus, cbus, dbus | Intrinsic delay/drive | clk rising |
| --- | --- | --- |
| ACxr, Acyr | Intrinsic delay/drive | clk rising |
| ACxz, Acyz | setup/hold times | clk rising |
| A Cxw, Acyw | setup/hold times | clk rising |
| HWStatus | intrinsic delay/drive | clk rising |
| Hwinst | intrinsic delay/drive | clk rising |
| Hwstrobe | intrinsic delay/drive | clk rising |
| Hwbshaden | intrinsic delay/drive | clk rising |
| Hwcshaden | intrinsic delay/drive | clk rising |
| Hwdshaden | intrinsic delay/drive | clk rising |
| Hwstallw | intrinsic delay/drive | clk falling |
| Hwerror | setup/hold times | clk rising |

An example of how usage of the hardware accelerator coupling scheme and of how software versus hardware trade-offs can be implemented is disclosed below, in video application field. Most of the cycle count in motion estimation comes from a Full Search (FS) task which consists of com- Distortions are stored on upper and lower parts of the accumulators. Mode 1 and 2 in the hardware accelerator allow the insertion of distortion on upper or lower parts as needed. As an example, if hardware instructions 00 and 01 are selected for mode selection, the main loop to manage this extension is given below.

```
Initializations:
    AR0 = (base address for reference window)
    AR2 = (base address for macroblock)
    AR3 = (base address for distortion storage)
    DR0 = #20
    DR1 = #16
    BRC0 = #5
    BRC1 = #16
    AR1 = AR0 + 1
    BK0 = #20
    BKC = #16
    AC0 = #0
```

-continued

```
        AC1 = #0
        AC2 = #0
Main loop for computation of the table of 5×5 distortions
    Repeat
    {
Processing of the contribution of the macroblock to a line of 5 distortions
(this code fits in the DSP Instruction Buffer):
        Local repeat
        {
            CDP = AR2
            || repeat #16
                AC0 = (*AR0+%)*(*CDP+%)), AC1 =
                (*AR1+%)*(*CDP+%)|| copr( )
            CDP = AR2
            || repeat #16
                AC2 = sat((*AR0+%) * (*CDP+%)), AC1 =
                sat((*AR1+%)*(*CDP+%))||copr( )
            mar(AR0+DR0)) || mar(AR2+DR1)
            mar(AR1 +DR0)
        }
Storage of distortions (and preparation of next iterations):
        dbl(*AR3+) = AC0 || DR0 = DR0 + #20
        *AR3+ = LO(AC1) || AR0 = (base address for
        reference window)
        dbl(*AR3+) = AC2 || AR1 = AR0 + DR0
        AR2 = (bas address for macroblock) || mar(AR0+DR0)
        AC0 = #0 || mar(AR1+)
        AC1 = #0
        AC2 = #0
    }
```

If the main loop does not fit in the DSP core instruction buffer, first iteration inside will be executed with a cycle penalty on redefined instructions. As a result, execution time of the loop above can be evaluated as: 2775 cycles. The total number of Mean Absolute Error computations (sub followed by abs( ) and then by add) are 25×16×16=6400, which means 2.3 computations per cycle.

Division operations on the above hardware accelerator are facilitated by an algorithm implemented in the hardware accelerator as described below.

Figure 48:
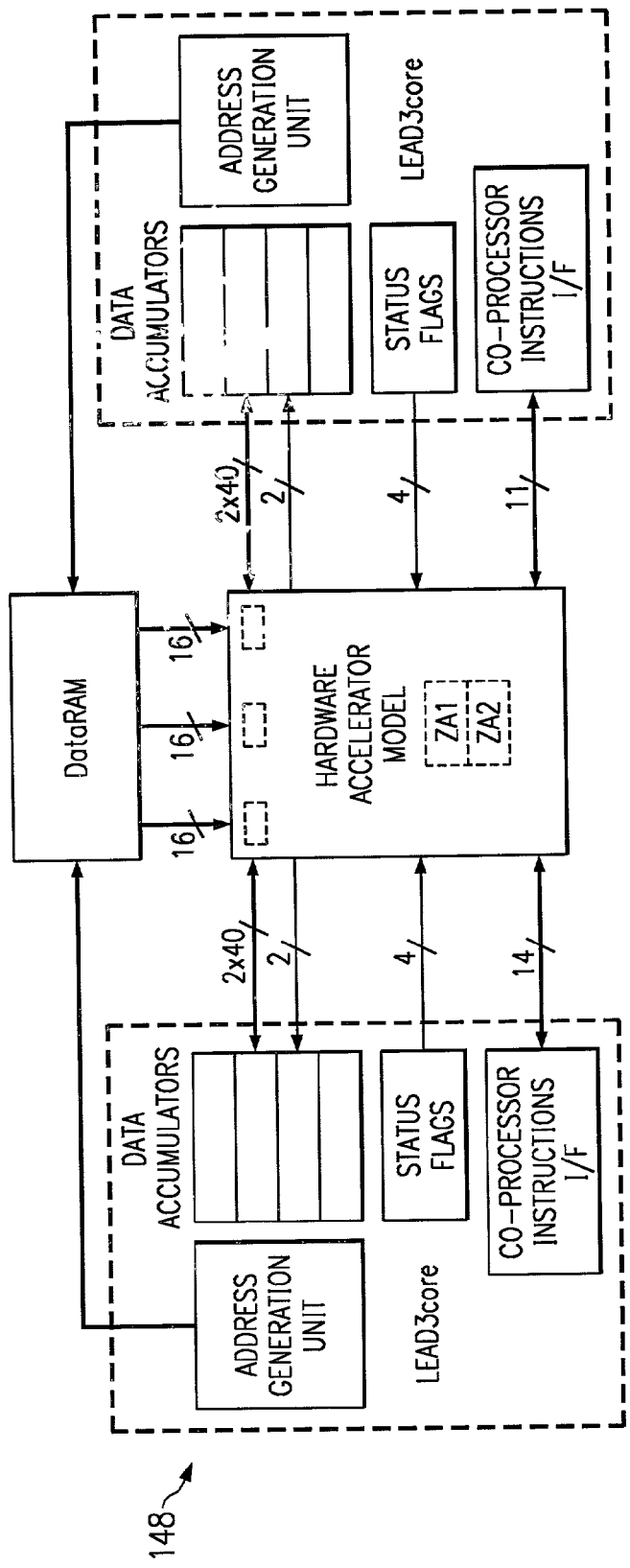
FIG. 48 is block diagram of a data processing system according to another embodiment of the invention.

While the inventions of FIGS. 19 and 20 disclose a hardware accelerator coupled to a single processor, the hardware accelerator can also be used to connect two DSPs (TI-C55xs as shown generally in FIG. 48) cores together, because what can be done in a single core embodiment can also be used in a multi-core embodiment to synchronize the transfer of internal resources of one core to the other, using the hardware accelerator protocol. Thus is may be desirable to have two cores and a hardware accelerator on the same chip when there is a need to exchange some of the computation, via daisy chaining—similar to what can be done in SIMD machines where operators exchange values—especially if they share the same program or execute the same type of program.

Fast Division Algorithm

Divs( )—Base Algorithms

Divs algorithm is an exact algorithm (fixed point algorithm) that works with a fixed number of iterations to obtain by testing and subtracting an exact result.

Divs algorithm permits division on elements in Q-15 format. Q-15 format works between [−1,1] and elements coded with 16 bit words. It is a fixed point format but it works in fractional representation ($X_{frac} \in [-1,1[$, i.e $X_{frac}=X_{int}*2^{-15}$). In fact, point is put just after the sign bit:

| 0 | 0 | 1 | 0 | 1 | 0 | 0 | 0 | 0 | 0 | 0 | 1 | 0 | 1 | 0 | 1 |
|---|---|---|---|---|---|---|---|---|---|---|---|---|---|---|---|

Figure 21:
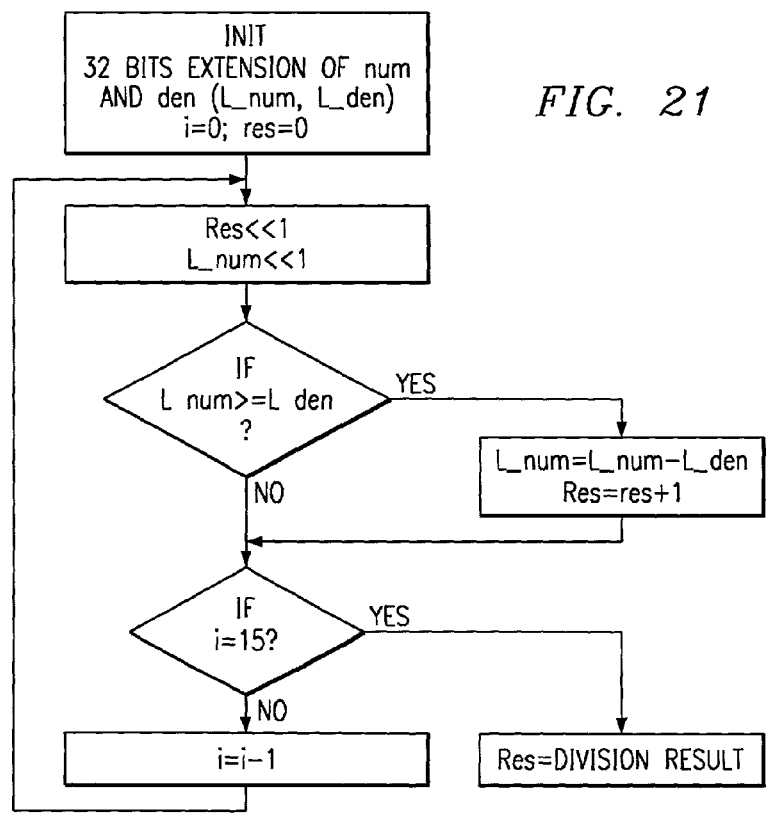
FIG. 21 illustrates a flow chart for an algorithm.

Represents: $2^{-2} + 2^{-4} + 2^{-11} + 2^{-13} + 2^{-15}$ or 0h2819 * $2^{-15}$ This format avoids using floating points representation and processing at the expense of some accuracy (and the need for frequent re-alignment of data). Divs works only with positive values and with the condition: numerator<=denominator. The flow chart in FIG. 21 presents the algorithm behaviour:

Divs( ) is an exact algorithm, and processing (test on the right of FIG. 21, L_num>=L_den) is executed bit by bit.

Q15 division consists on:

$$\frac{A_{q15}}{B_{q15}} = \frac{A_{integer} * 2^{-15}}{B_{integer} * 2^{-15}} = Q_{integer}$$

Therefore, as we desire result Q in $q_{15}$ format, following operation is realized to obtain the result in q15 format:

$$Q_{q15} = (Q_{integer} * 2^{\wedge-15}) * 2^{\wedge-15}$$

The 15 bit shifting ($\Leftrightarrow *2^{-15}$) permits to obtain quotient result in q15 format.

To illustrate algorithm behaviour, we can see with 4 bits elements the different values at each iteration with 4 iterations:

TABLE 8

|       | num | S | 0 | 0 | 1 | 0 | den | S | 1 | 0 | 0 | 0 | res | S | 0 | 0 | 0 | 0 |
|-------|-----|---|---|---|---|---|-----|---|---|---|---|---|-----|---|---|---|---|---|
| I=0   |     | S | 0 | 0 | 0 | 0 | 1 | 0 | 0 | S | 0 | 0 | 0 | 1 | 0 | 0 | 0 | res | S | 0 | 0 | 0 | 0 |
| I=1   |     | S | 0 | 0 | 0 | 1 | 0 | 0 | 0 | S | 0 | 0 | 0 | 1 | 0 | 0 | 0 | res | S | 0 | 0 | 0 | 0 |
| Test L_num => L_den OK so L_num - L_den and res = res +1 | | | | | | | | | | | | | | | res | S | 0 | 0 | 0 | 1 |
| I=2   |     | S | 0 | 0 | 0 | 0 | 0 | 0 | 0 | S | 0 | 0 | 0 | 1 | 0 | 0 | 0 | res | S | 0 | 0 | 1 | 0 |
| I=3   |     | S | 0 | 0 | 0 | 0 | 0 | 0 | 0 | S | 0 | 0 | 0 | 1 | 0 | 0 | 0 | res | S | 0 | 1 | 0 | 0 |

The algorithm for the division: 0010/1000 gives a good result 0100 (0,25 in q15 format) after 4 iterations. For 16 bits element, algorithm behaviour is the same. Assembly implementation (with subc instruction), gives the same number of iterations, at 1 subc per cycle, equals 16 cycles. The next task is reducing this cycle count.

Radix Q15 Division

A) First Approach

Figure 22:
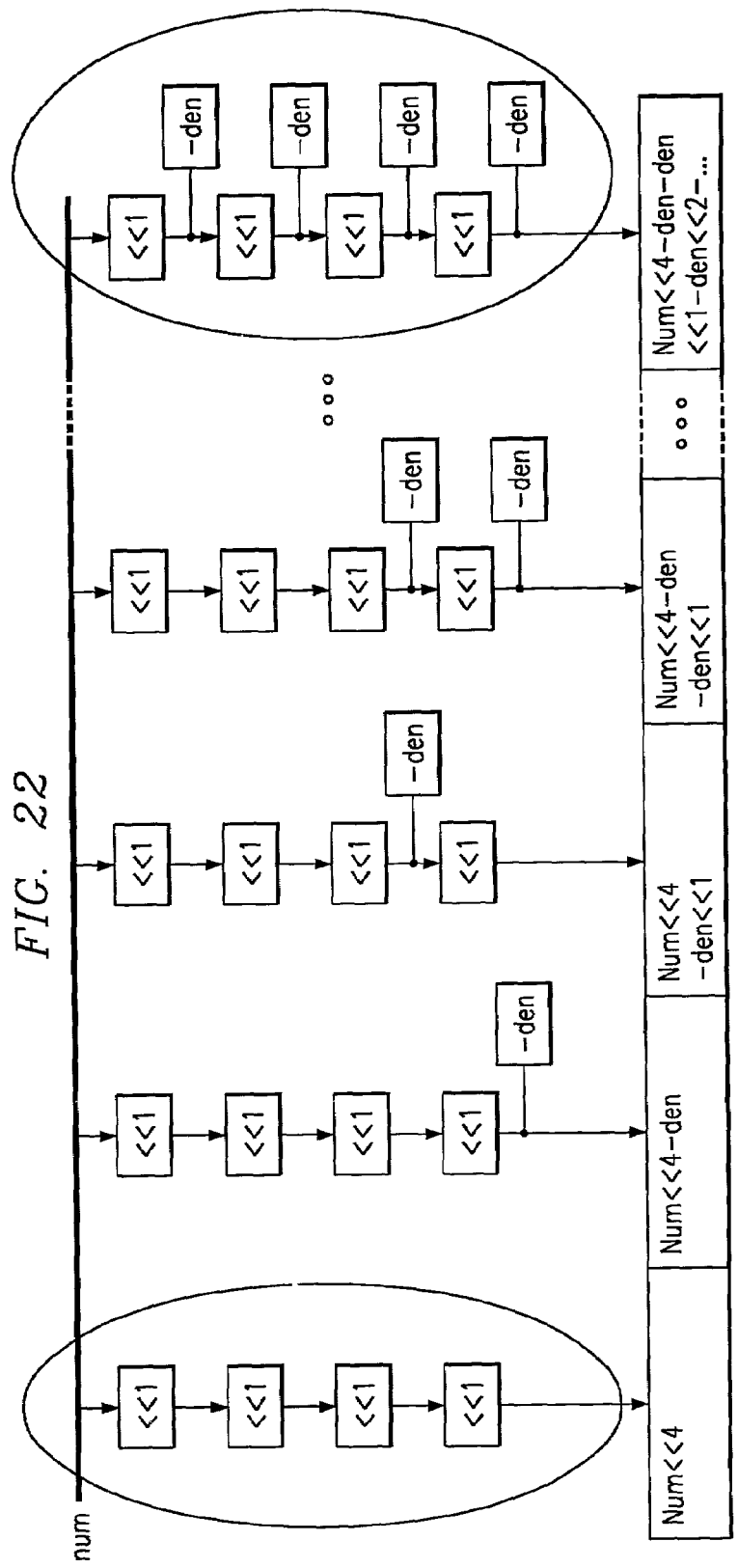
FIG. 22 illustrates an operation for determining a subtract numerator and denominator.

To reduce the cycle number, division is carried out digit-by-digit (so n bits by n bits), instead of bit by bit. In the current embodiment, 4 bits by digit was selected to reduce division operation into 4 cycles. At the end of each iteration, the numerator is shifted 4 times. At the end of the division cycles, the numerator will be shifted 4*4=16 times (*$2^{-16}$). The lsbs must be re-aligned by one bit to get the final result. A regrouping of the operation digit-by-digit produces the subtract numerator and denominator illustrated in FIG. 22. The denominator shifting number corresponds to the 4 bits intermediate quotient q, resulting in the operation: num<<4–q*den.

Next step is choosing the quotient in a table, just with the most significant bits of numerator and denominator (using a Look Up Table), compute new numerator (with num <<4–q*den) and re-iterate four times the operation.

To fill the look up table, the domain of selection for the intermediate quotient must be defined.

B) Domain Definition.

1) Domain Definition with max Precision (16 bits) on Numerator and Denominator.

Divide A/B with A and B in Q15 format, positive and with the condition A<=B. At first, B will be normalized, so B will be shifted to obtain a form: B=0xxx . . . xxxx (i.e ½<=B<1). At each iteration, $num_i$ ($numb_i=num_{i-1}<<4-j*den$) must respect the following condition:

$$\boxed{0 \leq num_1 \leq div\_max < B.} \quad (div\_max : maxnum_1\,boundary) \quad (1)$$

($div_{13}$ max: $num_i$ boundary) (1)

At the new iteration, it is possible to select a new partial quotient j if it exists 2 limits Inf(j) and Sup(j) which allow to define a possible selection domain of partial quotient j:

$$\boxed{Inf(j) <= 16*num_i <= Sup(j)} \quad (16*num_1 = num_i << 4) \quad (2)$$

(16*$num_i=num_i<<4$)  (2)

The result being:

$$\boxed{0 <= Inf(j) - j*B <= 16*num_1 - j*B <= Sup(j) - j*B <= div\_max} \quad (3)$$

(3)

Using relations (1) and (2), deduce div_max value:
  Inf($j_{max}$)<=div_max<=Sup($j_{max}$) with j boundaries: 0<=j<=$j_{max}$ Define div_max with the relation:
  div_max=16*div_max–$j_{max}$*B div_max=($j_{max}$*B)/15.

Using relation (1), deduce: ($j_{max}$*B)/15<B, so:

$$\boxed{J_{max} = 14}$$

and $$\boxed{Div\_max = (14/15)*B}.$$

Similarly, with relation (1), deduce the boundaries of Sup(j) and Inf(j):

| 0 <= Inf(j)–j*B | Inf(j)$_{min}$ = j*B. |
| Sup(j) – j*B <= div_max | Sup(j)$_{max}$ = j*B + div_max = (j + 14/15) * B |

Using max precision (16 bits), continuity along the solution space imposes:
  Sup(j–1)=>Inf(j)((j–1)+14/15)*B=>(j–cte)*B.

Accordingly, constant value is $$\boxed{cte = B/15}$$

which facilitates defining the different domain value for each j value.

$$\boxed{\begin{array}{l} Sup(j) = (j + 14/15)*B \\ Inf(j) = (j - 1/15)*B. \end{array}}$$

Figure 23:
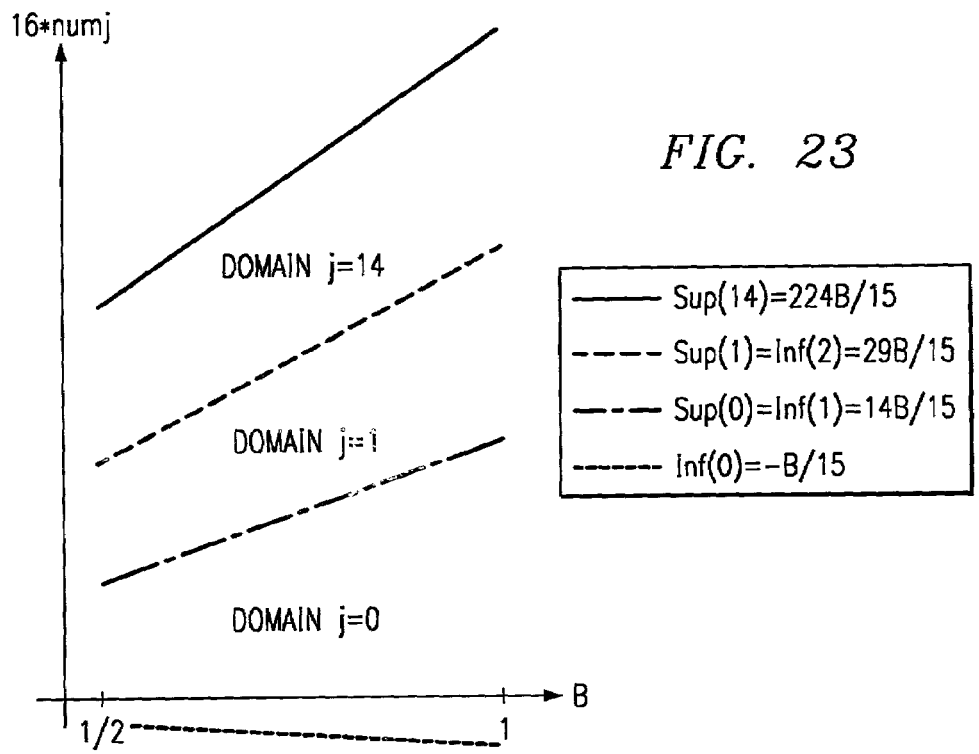
FIG. 23 is a graph illustrating quotient selection values.

The quotient domain selection for (16*num and den) values is illustrated in FIG. 23. Max precision (16 bits) on Num*16 and den values are used to select a quotient. For a couple of (16num,den), there exists a quotient domain. If a solution is on the domain limit, the biggest quotient is chosen. For the values between div_max and B (div_max <<B, cf relation (1)), a special processing is adopted.

2) Domains Definition with Truncated Numerator and Denominator

Figure 24:
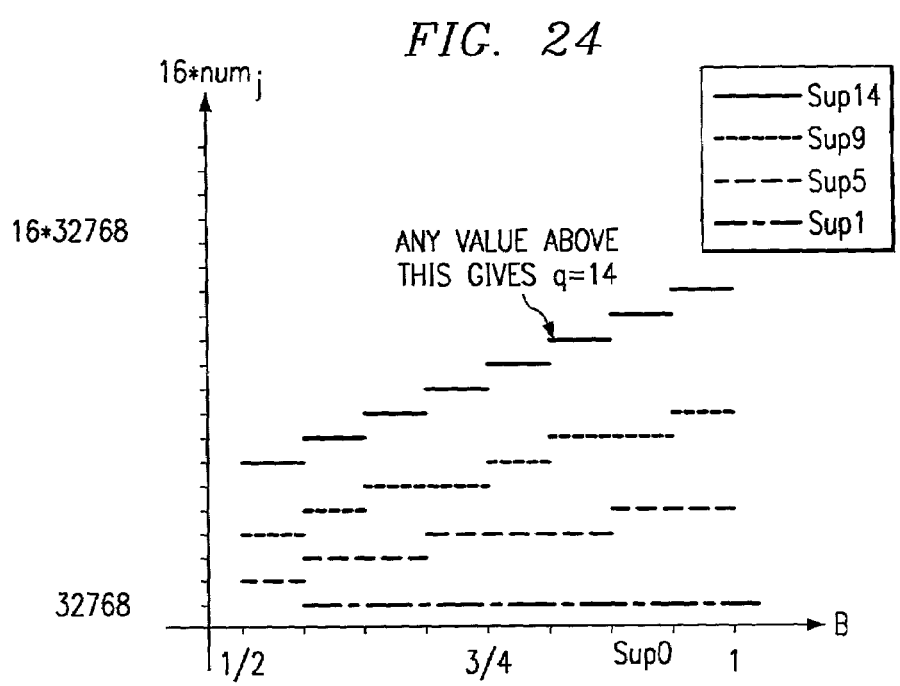
FIG. 24 is a graph of a domain curve.
Figure 25:
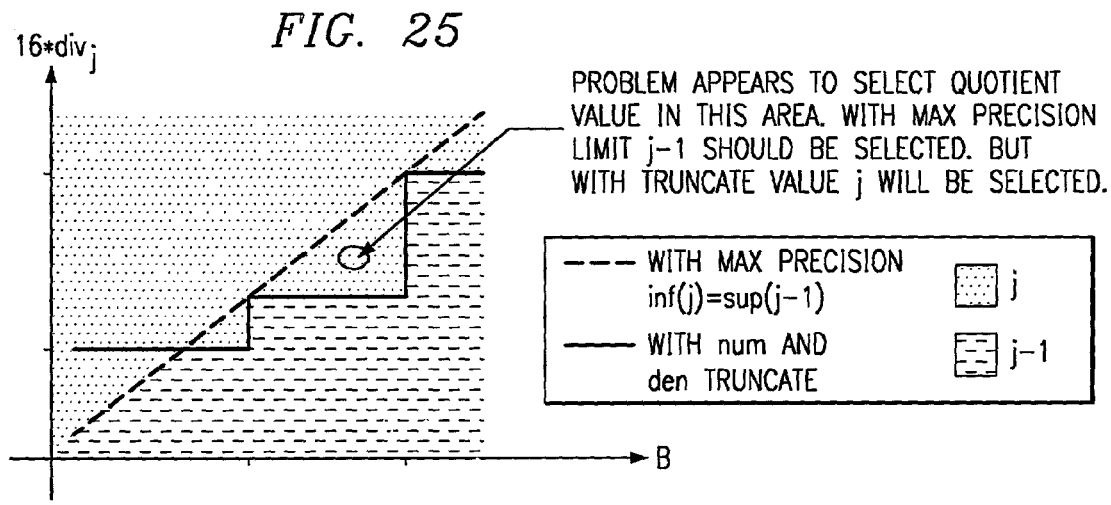
FIG. 25 is a graph of the critical area.

Using "A) Domain definition with max precision (16 bits) on numerator and denominator" version of domains definition, for each value of numerator and denominator couple, a value of selected quotient must be defined. The resulting Look Up Table size is/will be enormous. The idea is to try to select partial quotient only with a part of numerator and denominator, i.e only with their most significant bits. Accordingly, estimate with partial numerator and denominator, the intermediate quotient. Further, sample axes of the quotient selection domain with the bit precision truncation (as seen in C implementation of the algorithm the number of bits chosen of the numerator and the denominator). The above actions produce the domain curve illustrated in FIG. 24. However, a problem appears with the choice of the quotient value at the domain limit. An enlarged view of the critical area is illustrated in FIG. 25.

To correct LUT accuracy, quotient+1 and quotient−1 are to be calculated and selected if necessary (cf C and VHDL implementation).

There is a complexity trade off between LUT size and correction effort. Look Up Table size increases with number of bits chosen for numerator and denominator. If this bit number is not adequate, correction bloc complexity can increase (Q+2, Q−2 ... correction required). In fact, the good compromise between LUT complexity and correction bloc complexity was found with a C model of the algorithm, which was written to test algorithmic behavior.

To test the new algorithm, each possible division in data representation space has been tested by the authors with the value given by the base divs( ) algorithm. Moreover to validate functionality, tests have been performed on a real 3D picture.

Figure 27:
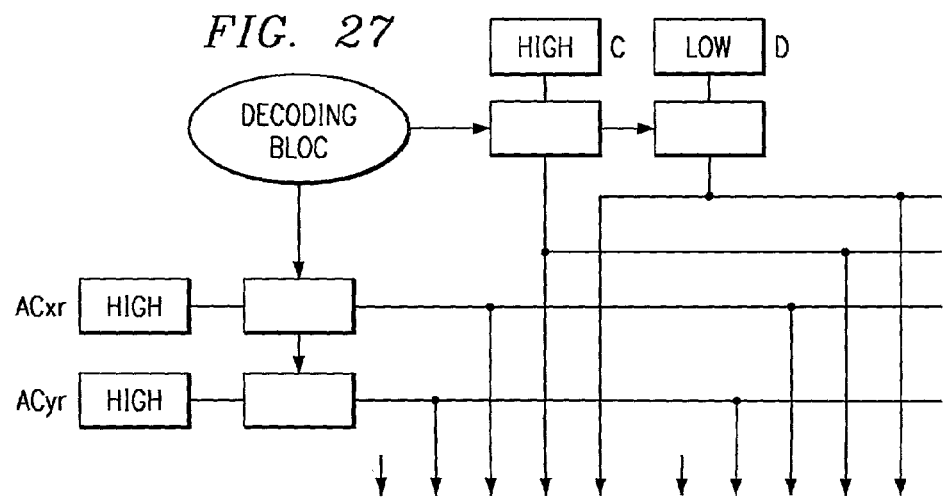
FIG. 27 illustrates a load stage.
Figure 28:
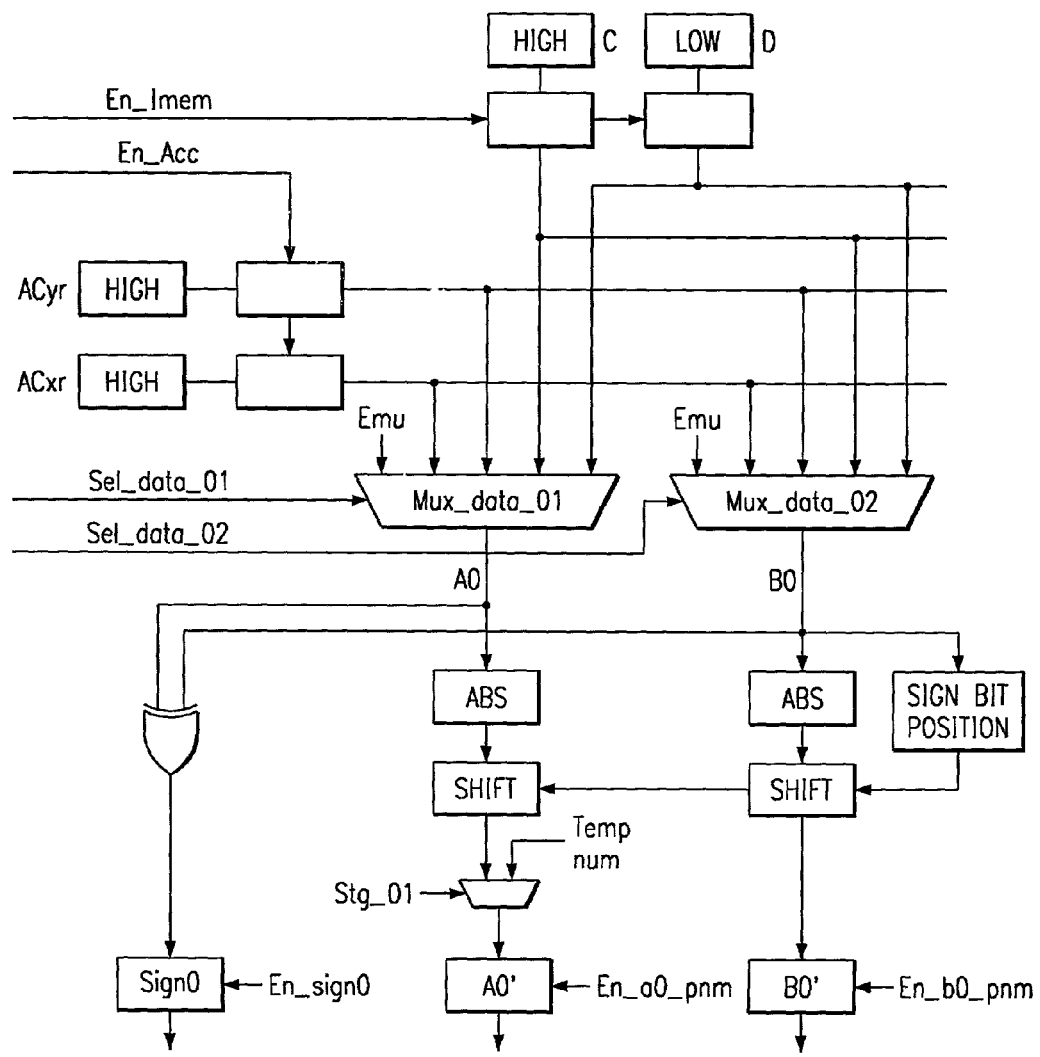
FIG. 28 illustrates a first stage.

Test results indicated a correct compromise:

| | |
|---|---|
| 5 bits for the numerator | ([15-11]) |
| 4 bits for the denominator | ([13-10] with normalized denominator 01XXXX). |
| Q+1, Q−1 correction. | | hwamp3_submodules_synth_a.vhd) are included in the top module description program. A load stage is illustrated in FIG. 27. This block permits loading of data from memory (Lmem) or from DU accumulators (Acx (high) and Acy (high). A first stage is illustrated in FIG. 28. The first stage facilitates the data selection: Mem/Mem, Acc/Acc, Mem/Acc, and Acc/Mem. Numerator and Denominator are stored in two registers (A0prim and B0prim) after normalization and we take absolute value of these elements. Sign of the result quotient is stored after its computation. For Absolute and shift functions (for the normalization), some Specific, pre-built, component is inferred in the code.

Temp_num selection permits at each algorithm iteration loading of A0' (num_register) with the new value of the numerator (result of $num_i = num_{i-1} << 4 - q*den$ operation cf division stages). A stg_01 signal is used to indicate, during the first stage, that A0' with the initial value of the numerator was loaded. The same value during each iteration is used for the denominator. Normalized numerator and denominator facilitate improved precision during the following stage. If significant bits, for numerator and denominator, are set in less significant positions, bits for LUT selection are null (we have first iteration with null value).

The value of the denominator is normalized to a form 01XXX .... As num<=den, the same shifting for the numerator is used. Sign bit position function provides shift value to obtain denominator form 01XXX ....

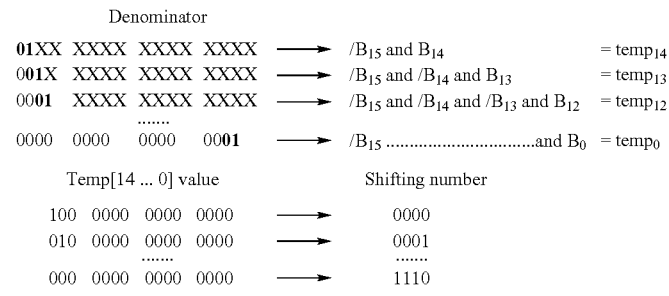

It is important to note that the final quotient result has to be divided by 2 (>>1, see above explanations, with re-alignment on the right).

Hardware Accelerator Architecture—for Division Operations

A) First Approach

Figure 26:
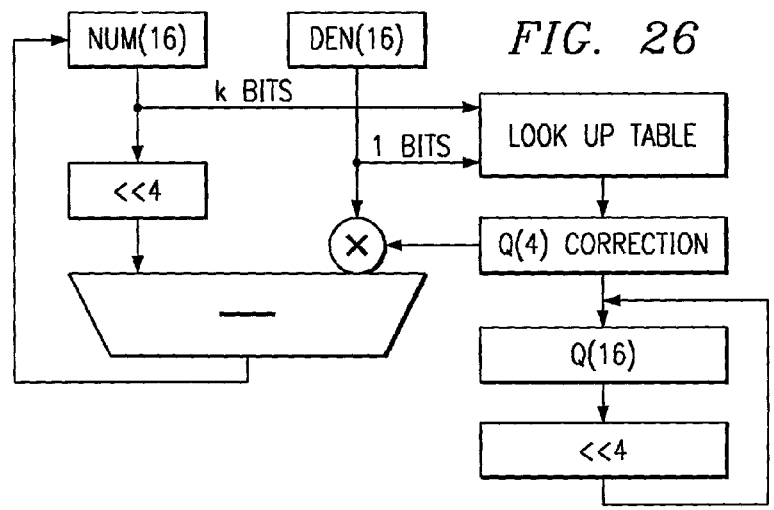
FIG. 26. illustrates a structure for determining quotient Q.

The structure in FIG. 26 is determined. Quotient Q is approximated at each interation. A correction (q−1,q+1) can be used to correct LUT inaccuracies.

B) VHDL-RTL Model

The selection of data, which comes from memory or Data Computation Accumulator, is realized in first stage. The Look Up Table uses following bit configurations: entry num [14-10] i.e 0XXXXX and entry den [13-10] i.e 01XXXX.

To implement the HWA, a top module hwamp3 (hwamp3_e.vhd and hwamp3_synth_a.vhd), where inputs and outputs of the HWA are described, contains sub-modules. These sub-modules (hwamp3_submodules_e.vhd and hwamp3_submodules_synth_a.vhd) are included in the top "Encoding" function is realized with process implementation with "case" statements.

Figure 29:
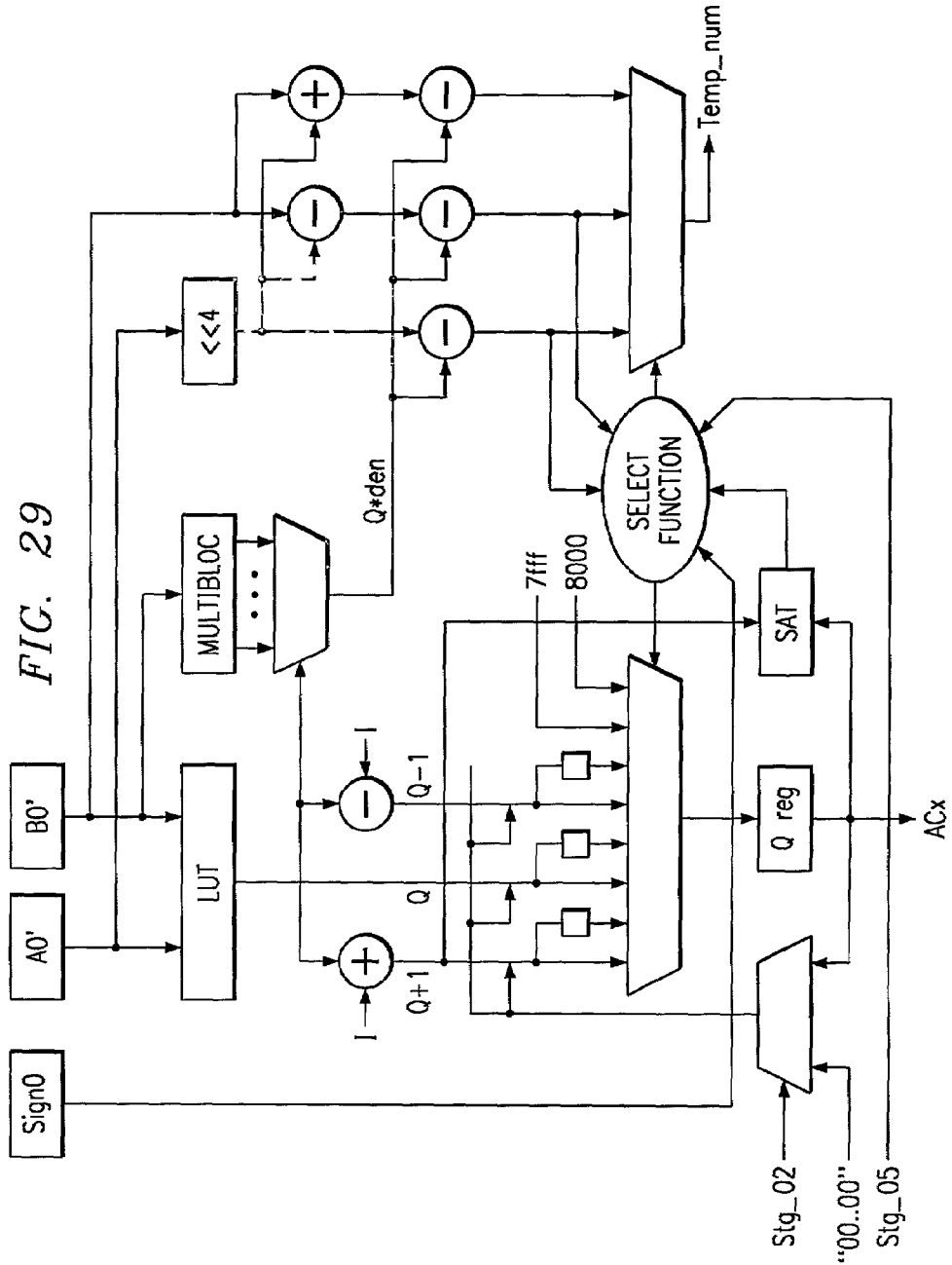
FIG. 29 illustrates a division stage architecture.
Figure 30:
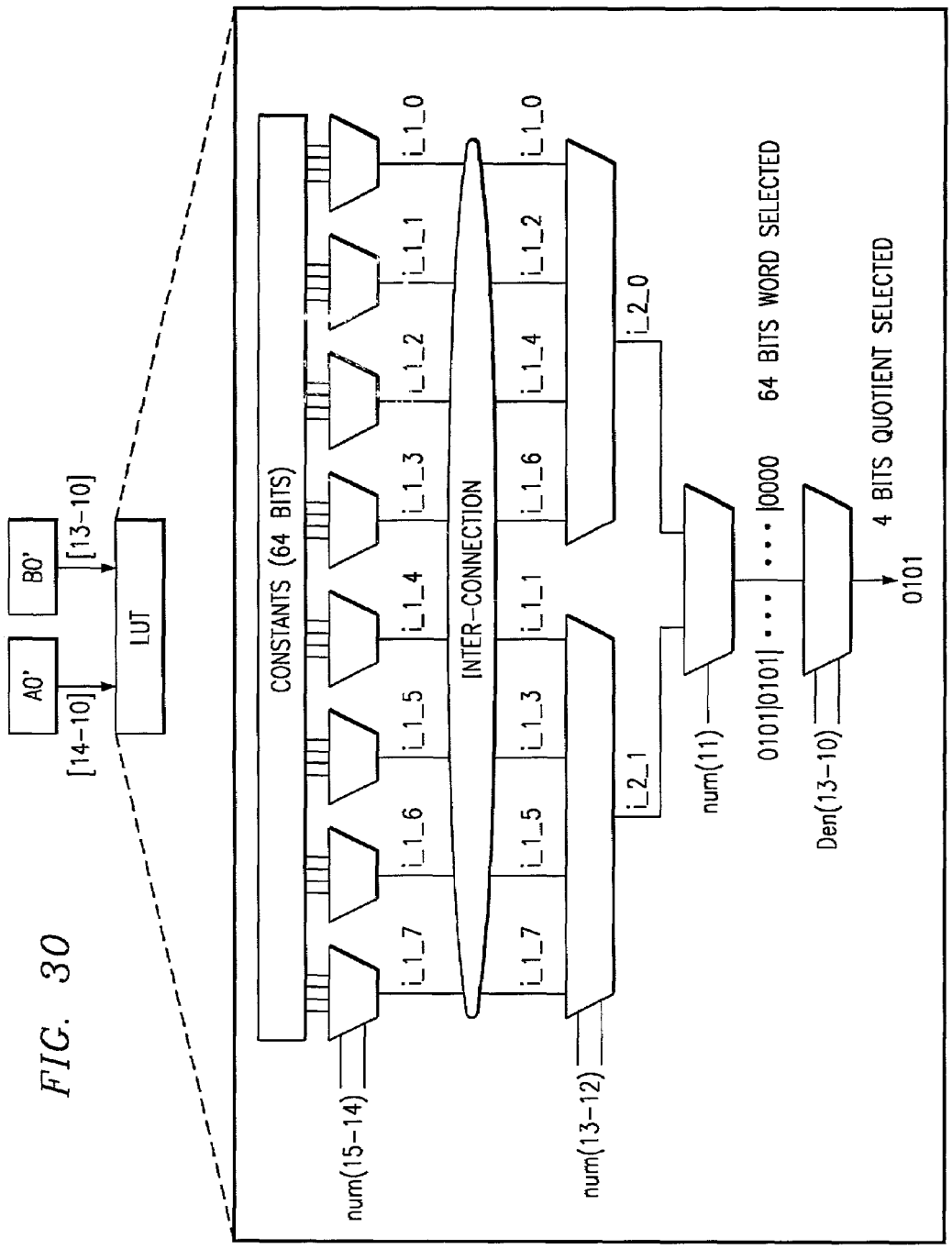
FIG. 30 is an enhanced partial illustration of FIG. 29 (A0', B0', LUT).
Figure 31:
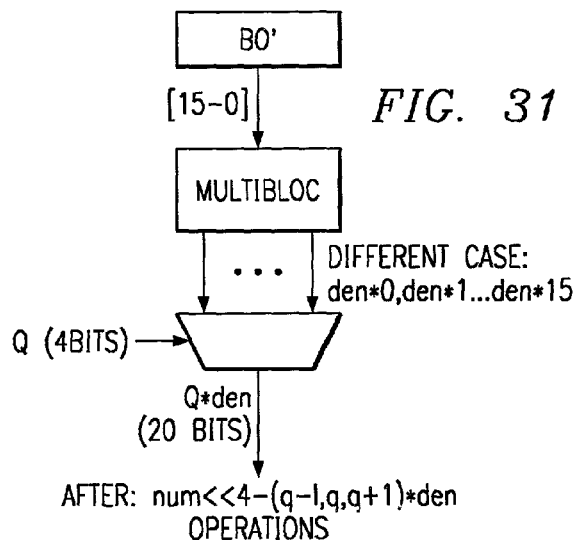
FIG. 31 is an enhanced partial illustration of FIG. 29 (B0', Multibloc, Q(4 bits)).

A "fourth" of the division is realized in one cycle. So Look Up Table addressing, numerator and quotient operations should be carried out in combinatorial logic. other implementations could pipeline this process and still acheive the same performance. Organizing the sub-blocks permits reducing the critical path. One division stage architecture is illustrated in FIG. 29. FIG. 30 is a more detailed illustration of a portion (A0', B0', LUT) of FIG. 29. FIG. 30 contemplates a Look Up Table with contants composed of 32 lines of 16 quotient values (on 4 bits for each), i.e. 32*16*4=2048 bits, 32*1=512 "four bit" words. Multiplexors system permits selection of correct quotient with truncated A0' and B0'. FIG. 31 is also a more detailed illustration of a portion (B0', Multibloc, Q(4 bits)) of FIG. 29. During look up table quotient selection, the hardware calculates the different cases of Q*den multiplication (no need to use a 4*16 multiplier operator). Thereafter, it selects the good product with the quotient at the LUT output.

The different products in the mulbloc are realized with shifting and addition (for addition can use specific, pre-built components). The resulting multbloc generates results on 20 bits and they are used to facilitate precision detection during the next operation.

Figure 32:
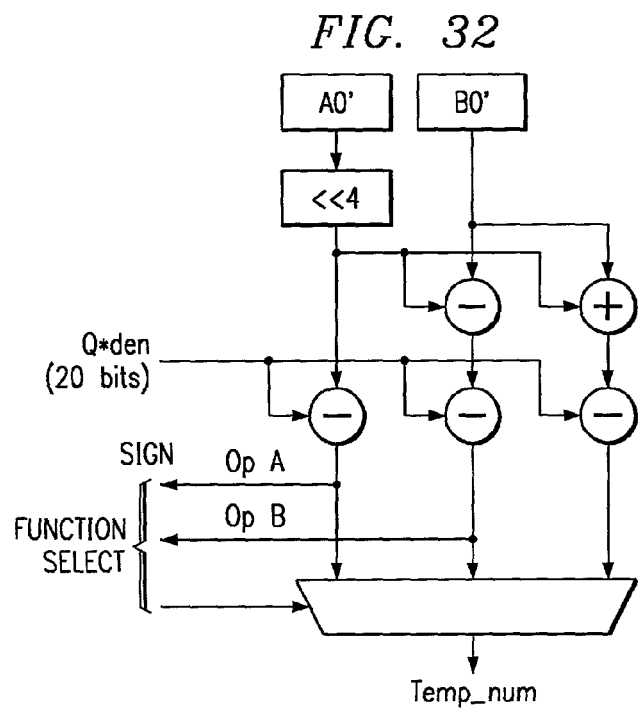
FIG. 32 is an enhanced partial illustration of FIG. 29 (A0', B0', <<4).

FIG. 32 is also a more detailed illustration of a portion (A0', B0", <<4) of FIG. 29. In FIG. 32, the operations are realized (on 20 bits). Num<<4−(q+1)*den (1) Num<<4−q*den (2). Num<<4−(q−1)*den (3). The shifting operation on the numerator is realized directly by wiring. Next, we decompose operations (1) and (3): (1) (Num<<4−den)−q*den; (2) (Num<<4+den)−q*den. A Selection function permits to choose betweethe different configurations. The signs of the operation results Op A and Op B permit determining which value to choose between q+1, q and q−1. (see below what the select function is).

Figure 33:
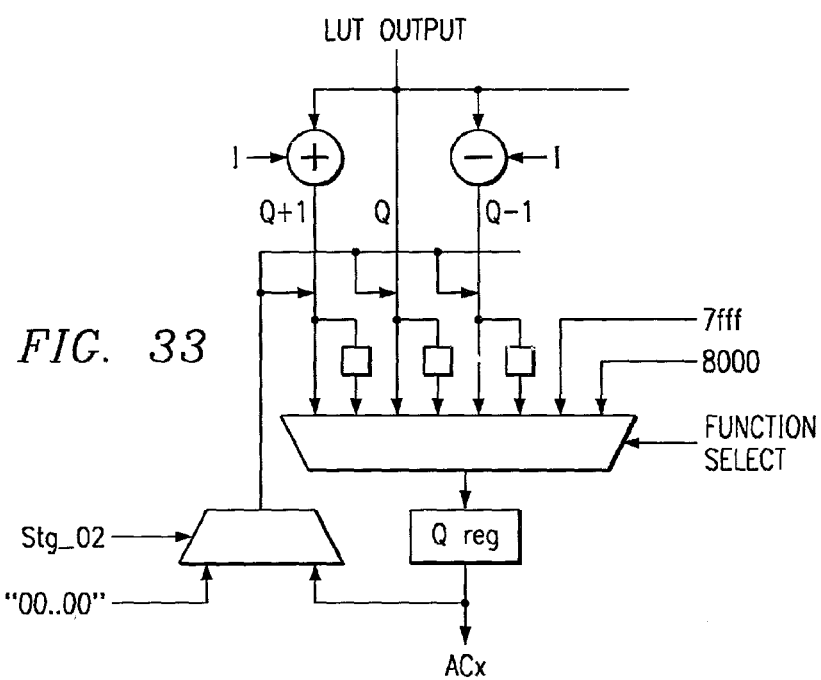
FIG. 33 is an enhanced partial illustration of FIG. 29 (LUT, +, −).
Figure 34:
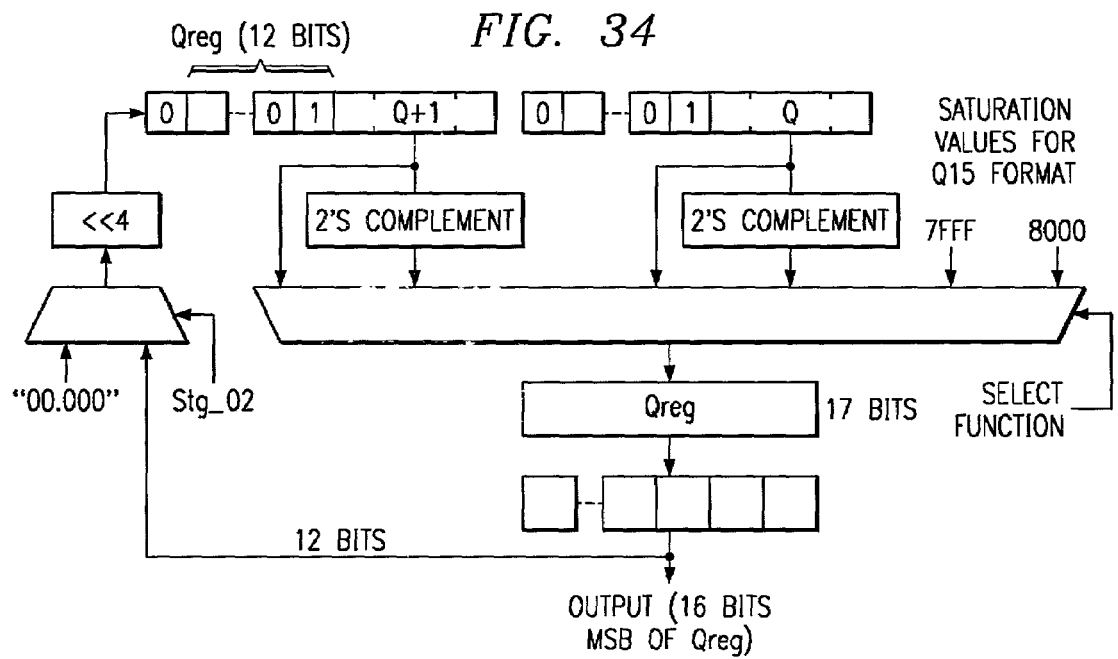
FIG. 34 illustrates a zoom of the different choices.

FIG. 33 is also a more detailed illustration of a portion (LUT, +, −) of FIG. 29. FIG. 33 illustrates the select function. Q+1 and Q−1 operations are realized in FIG. 33. For current iteration, new Q value (on 4 bits), and its correction Q+1 and Q−1. Next, Qreg value, which contains other Q values of the next iterations, is shifted, and forms with q, q−1, and q+1, three potential value of the intermediate quotient for the present iteration. After that, the selection function takes the good one. Details about the different choices is illustrated in FIG. 34. FIGS. 31-34 illustrate the second stage.

Figure 35:
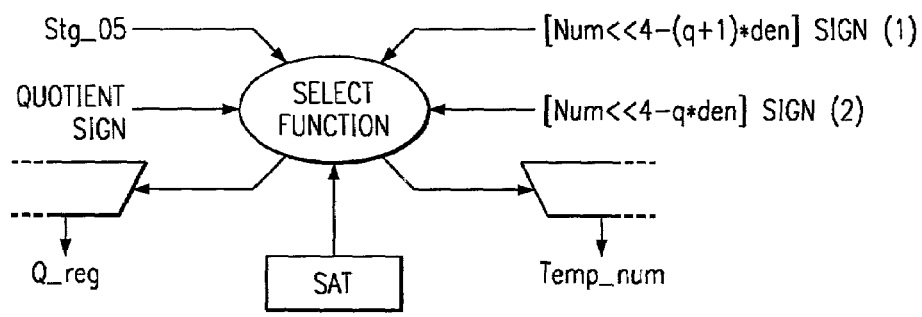
FIG. 35 illustrates the select function.

During the second stage, the quotient is re-initialized (cf mux with Stg_02 command). For each quotient value, the negative value is computed (with complement operation). Only, during the last stage, if the quotient sign is negative (cf first stage), these negative values can be chosen. Moreover, if a saturation phenomena appears, 0h7FFF or 0h8000 can be chosen. Qreg is a 17 bits register because at the output we take the most significant bits to avoid the last shifting (>>1). The result is a correctly selected quotient. Next, as illustrated in FIG. 35, the select function commands the temp_num and Q_reg multiplexors. In this function (as seen in Table 9), the sign of the operation (1) and (2), are decoded to know if quotient have to be corrected. Indeed, we can obtain the following sign combinations:

TABLE 9

| | | | |
|---|---|---|---|
| Num <<4 − (q + 1)*den | 0 | 1 | 1 |
| Num <<4 − q *den | X | 0 | 1 |
| Num <<4 − (q − 1)*den | X | X | 0 |

TABLE 9-continued

| ↓ | ↓ | ↓ |
|---|---|---|
| Q + 1 is Chosen | Q is chosen | Q − 1 is chosen |

The temp_num value is chosen as a function of quotient correction choice. Only sign bits of operation (1) and (2) are necessary to select the good correction (q+1,q−1) if it is necessary. Saturation phenomena can appear during the last stage of division and following computations evolution. For values num=den, quotient must be satured: 0h7fff if sign>0 and 0h8000 if Sign<0. Problem can appear for value between: Div_max<A<B where num #den.

For example, 30583/32767 (in Q15 format).

First iteration: q=14 num <<14−q*den = 30583*16 − 14*32767=30590
Second iteration: q=14 30590 *16 − 14 *32767 = 30702
Third iteration: q=14 30702 *16 − 14 *32767 = 32494
Fourth iteration: q=15 32494 *16 − 15 * 32767= 28399

Final quotient is 0hEEEF
(Without final shifting by 2)

Here, value mustn't be saturated, because the algorithm gives correct result.

Indeed, $(30583/32767)*2^{15}$=30583 (with truncating)

or 0hEEEF/2 (or >>2)=0h7777 ie 30583.

So to avoid saturation if it is not necessary, saturation bit is computed with Qreg value and q+1 value:

If during the last stage:

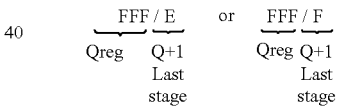

i.e, if each bit of Q_reg='1' and the 3 most significant bits of q+1 are ='1', saturation bit is equal to '1'. (Computed with AND cells) and saturation values: 7fff or 8000 will be chosen.

Next, we establish the following tables:

Command of Quotient Selection mux:

TABLE 10

| Stg_05 | sat | sgn | Sg(q) | Sg(q+1) | Selection value | Choice | Function |
|---|---|---|---|---|---|---|---|
| 0 | X | X | 0 | 0 | 000 | Q + 1 quotient | Normal |
| Idem | idem | idem | 0 | 1 | 010 | Q quotient | Normal |
| Idem | idem | idem | 1 | 1 | 100 | Q − 1 quotient | Normal |
| 1 | 1 | 0 | X | X | 110 | 7FFF | Last_stage-sgn>0 and sat |
| 1 | 1 | 1 | X | X | 111 | 8000 | Last_stage-sgn<0 and sat |
| 1 | 0 | 0 | 0 | 0 | 000 | Q + 1 quotient | Last_stage - sgn >0 |
| Idem | idem | idem | 0 | 1 | 010 | Q quotient | Last_stage - sgn >0 |
| Idem | idem | idem | 1 | 1 | 100 | Q − 1 quotient | Last_stage - sgn >0 |
| 1 | 0 | 1 | 0 | 0 | 001 | /Q + 1 quotient | Last_stage - sgn <0 |
| Idem | idem | idem | 0 | 1 | 011 | /Q quotient | Last_stage - sgn <0 |
| idem | idem | idem | 1 | 1 | 101 | /Q − 1 quotient | Last_stage - sgn <0 |

Sg(q), Sg(q + 1) = Sign of num<<4 − (q + 1,q)*den

Command of temp_num mux:

TABLE 11

| Sg(q + 1) | Sg(q) | command | choice |
|---|---|---|---|
| 0 | 0 | 00 | Temp__num = num<<4 − (q + 1)*den |
| 1 | 0 | 10 | Temp__num = num<<4 − (q)*den |
| 1 | 1 | 11 | Temp__num = num<<4 − (q − 1)*den |

In the VHDL code, these tables are implemented in a process with "case" statements.

C) C-RTL Model

1) Instructions Description

Here we describe the instruction types and sequences to control the division operator in pipelined and non pipelined modes:

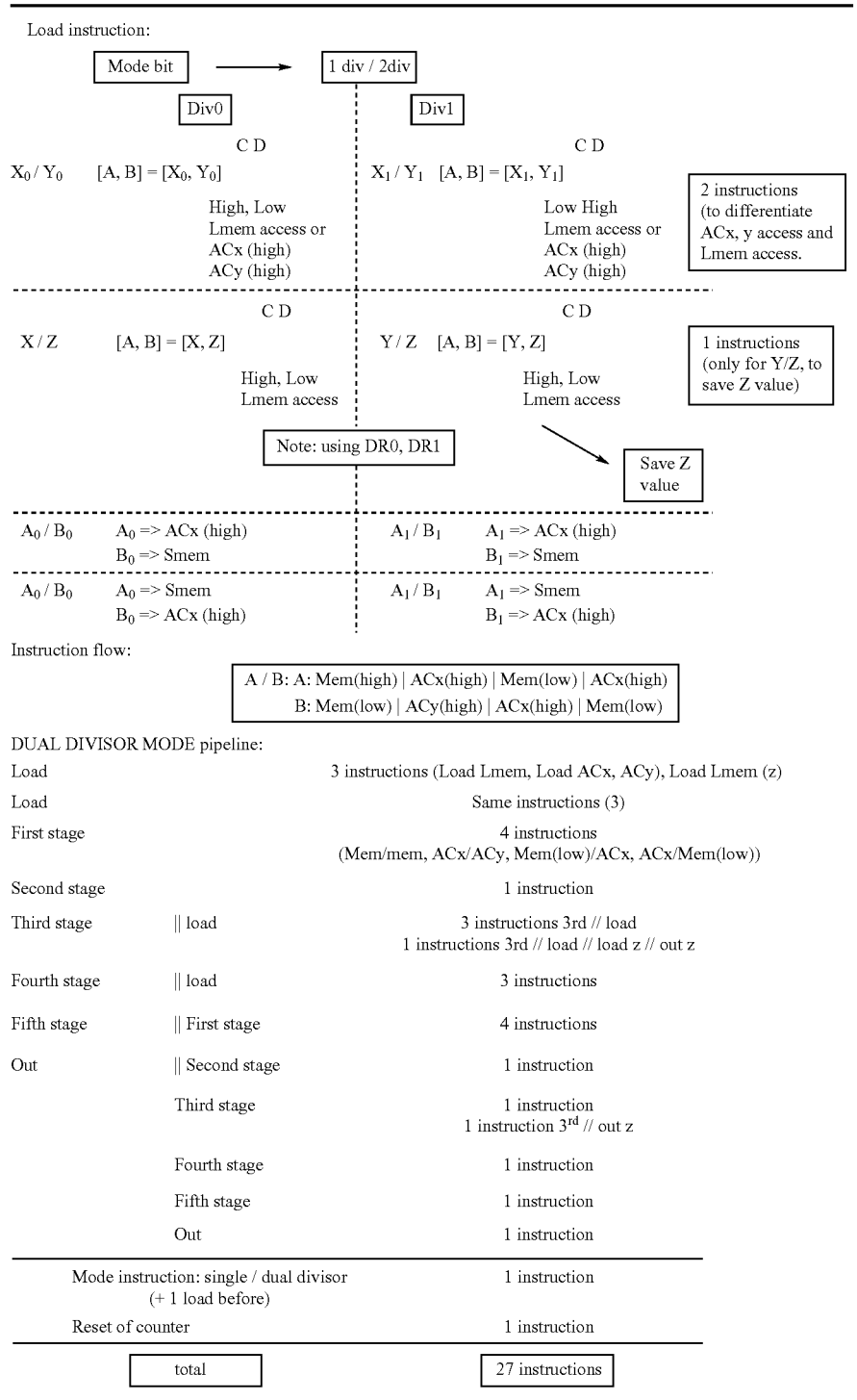

SINGLE DIVISOR pipeline (same instructions as for dual division, only the mode changes):

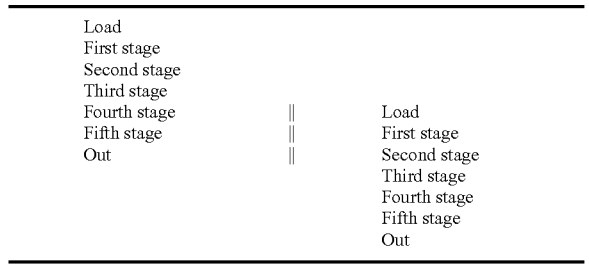

2) Mux Command and Register Enable

Default value is "0" for mux command and enable. Dual signal indicates: "0" single divisor—"1" dual divisor(div0, div1).

The ct (counter signal) indicates: "0" always div0 is loaded (Dual = "0").
"2" div0 is loaded (Dual = "1").
"1" div1 is loaded (Dual = "1").

At each iteration the counter is incremented. There are always 2 instructions between 2 load, so div0 in Dual mode is load in first.

3) C_RTL Model—HWA6

In this model, the bloc which decodes, the copr( ) instruction, the counter which permits to load Div0 then Div1, and the operator div0, div1 are described.

The function void init_table (void) permit to initialize the look up table.

The function void norm_var (short a_in, short b_in, short *sgn_out, short *aprim, short *bprim) permits to normalize numerator and denominator, to take absolute value of these operands, and to determinate the quotient sign.

The function void div (short aprim, short bprim, short sign, int stg_05, short q_in, short *quot, short *temp_num) permits to execute one stage of the division.

Figure 36A:
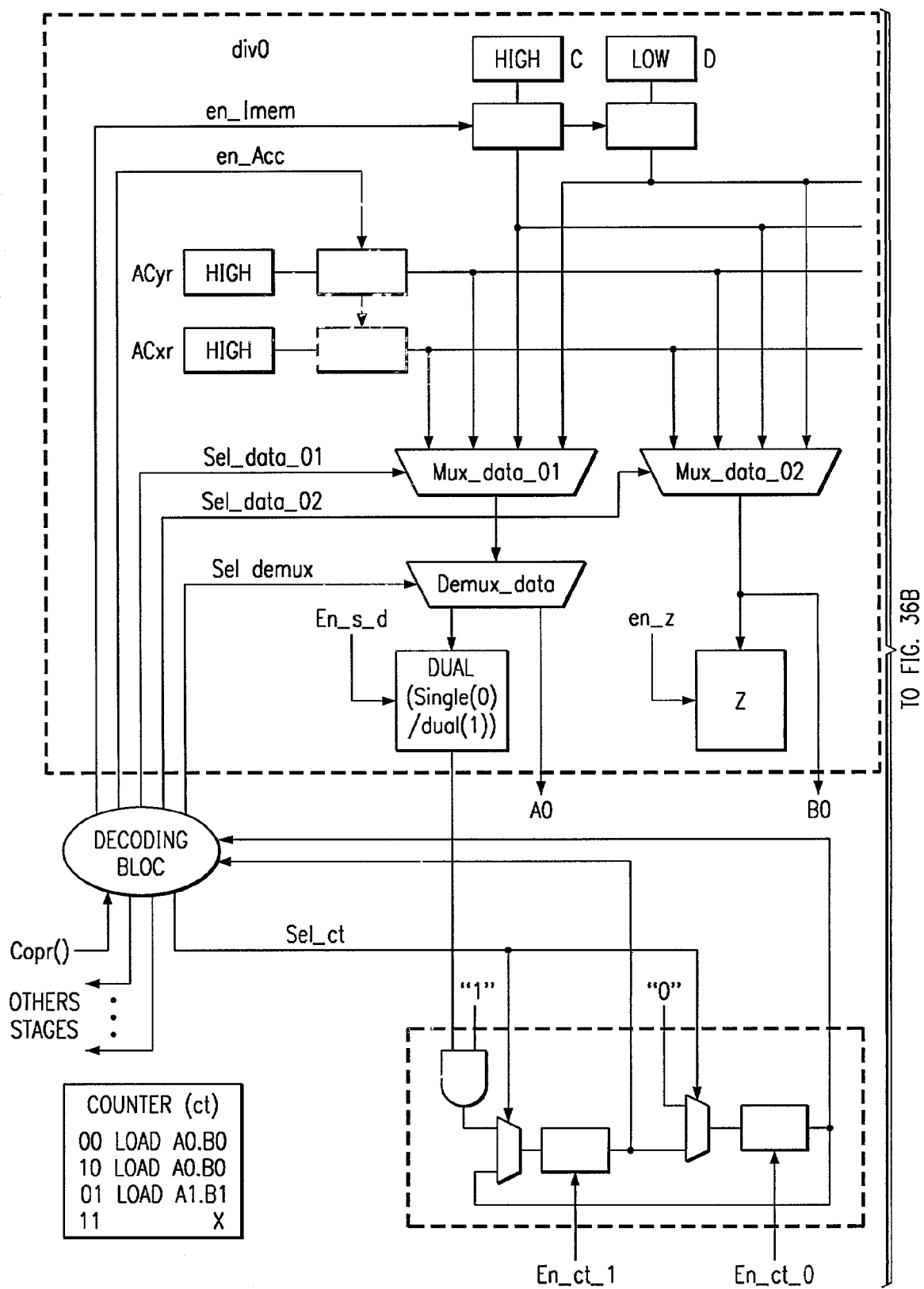
FIG. 36 illustrates the resulting single_dual datapath.
Figure 36B:
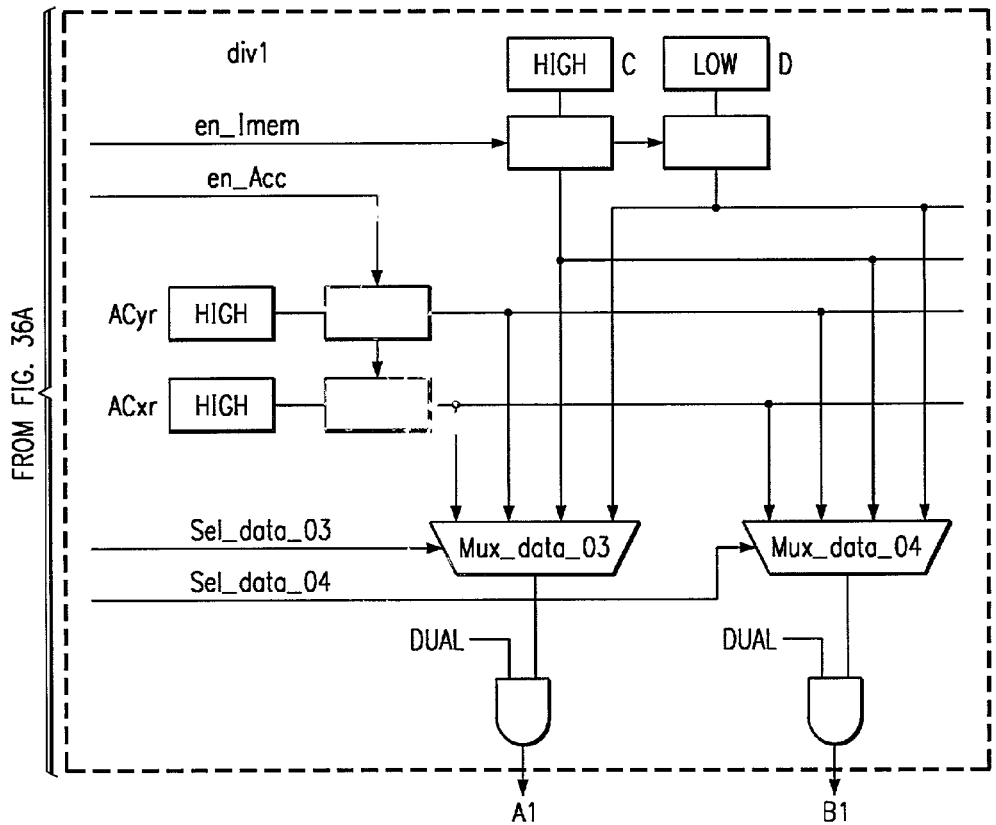
Figure 37:
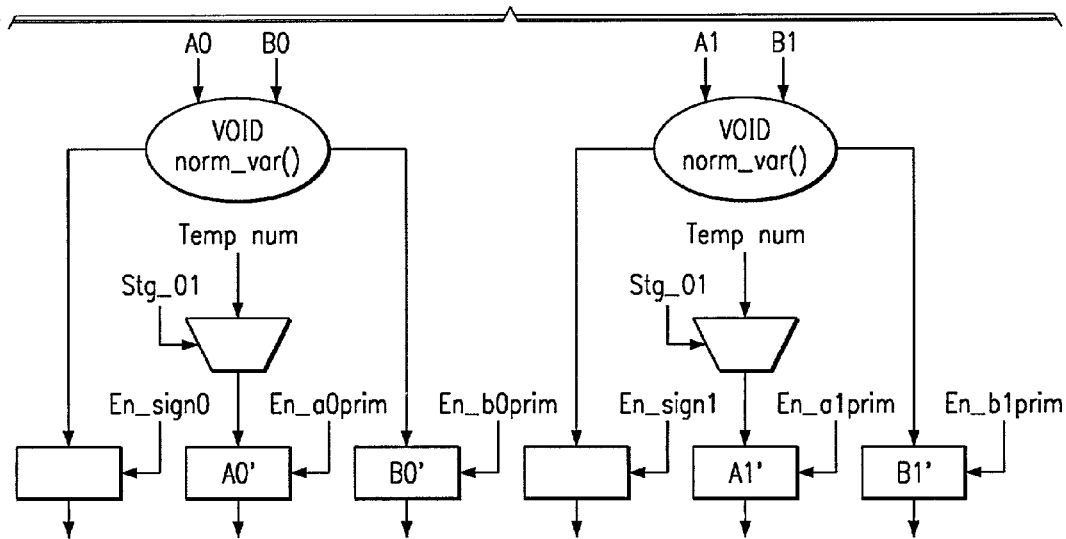
FIG. 37 illustrates the end of first stage.
Figure 38:
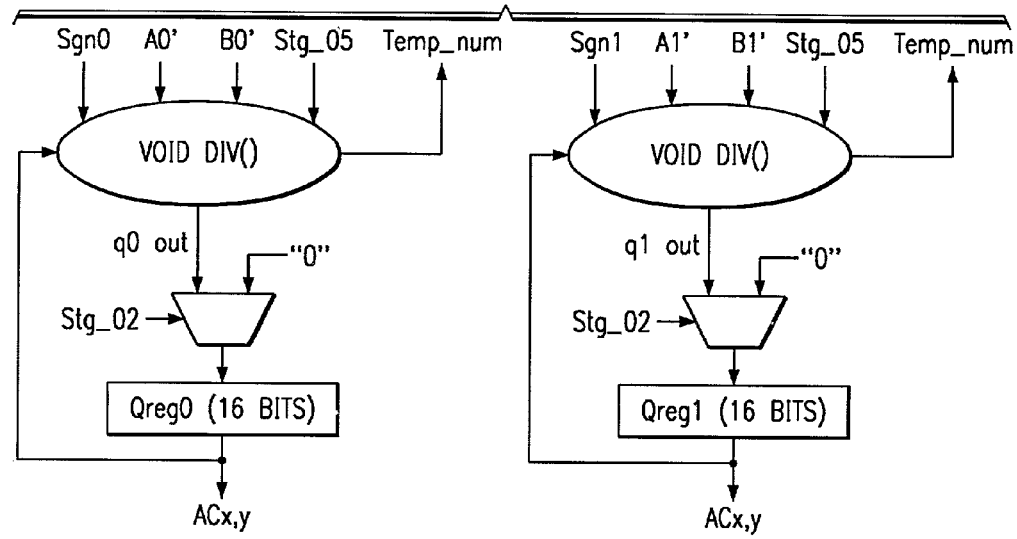
FIG. 38 illustrates the division stage.

The resulting organization is illustrated in FIG. 36. The end of first stage is illustrated in FIG. 37. The division stage is illustrated in FIG. 38.

Figure 39:
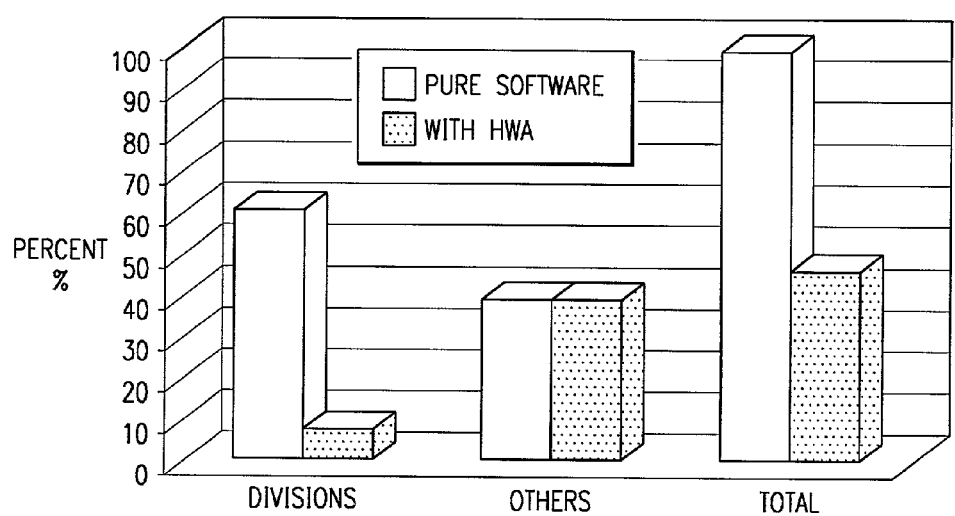
FIG. 39 is a graph illustrating the percentage of cycles used in division and other operations.
Figure 40:
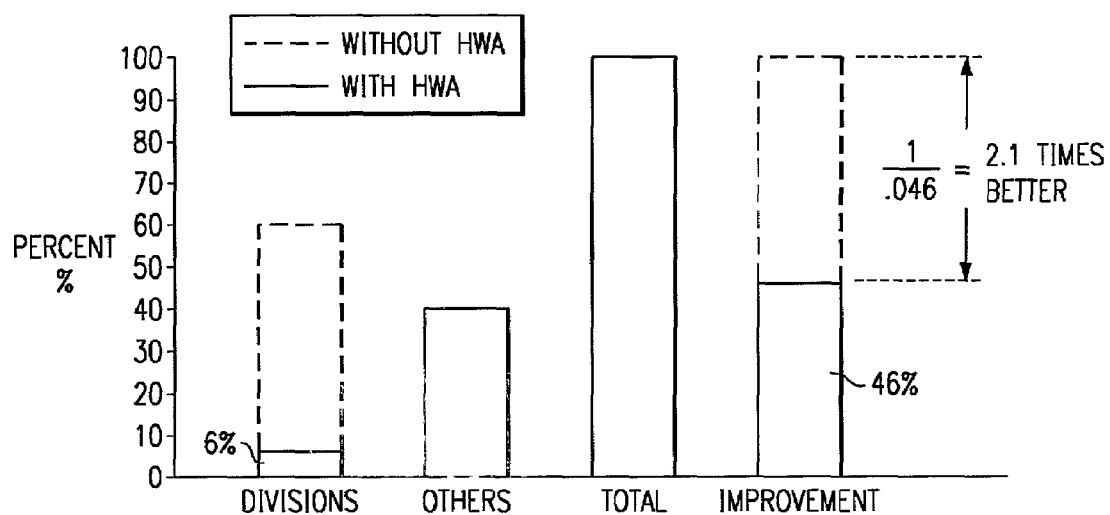
FIG. 40 is a graph illustrating the gain provided by the present invention.

Looking at divisional operations and other operations (such as test, multiply, apps., other) for video imaging processing, division is 60 percent of the total, the rest is 40 percent, as illustrated in FIG. 39. Today on the C55x DSP (excluding the hardware accelerator extension of the present invention) manufactured by Texas Instruments, each division operation requires 20 cycles. With the hardware accelerator extension of the present invention, the C55x DSP performs division in a pipelined way which performs two divisions at a time. The performance will be one division every 2 cycles. The invention thus reduces a division operation from 20 to 2 cycles. This means that the utilization period of division operations in a DSP goes from 60% to 6%, processing the rasterization pipeline of a 3D image sequence. Accordingly, the utilization percentage drops from 100% for operations to 46%. So the gain is 1/0.46=2.1 times better, as illustrated in FIG. 40. Therefore, a DSP using the invention can perform the same task 2× lower power consumption for same image size, as compared with a DSP not using the invention.

Considering voltage, the invention allows a drop from VDDmax to VDDmin—1.5 v down to 1.0 volt, because the performance requirement is reduced, which results in another 30% in gain in mA. 2.1× is the gain in energy e as frequency is reduced for the same task. 2.1×1.5=3.2 times is the gain in power if, further, voltage is reduced. For the same energy (mA), image size can be multiplied by about 1.5 times, or 1.5 times more triangles can be rendered in the image or the image rate, in sequences, can be improved in the same rate. This provides a significant advantage over present technology. The invention thus puts a DSP into the same performance level as other processors (such as the Pentium) for video imaging processing, but at much lower power.

Figure 41:
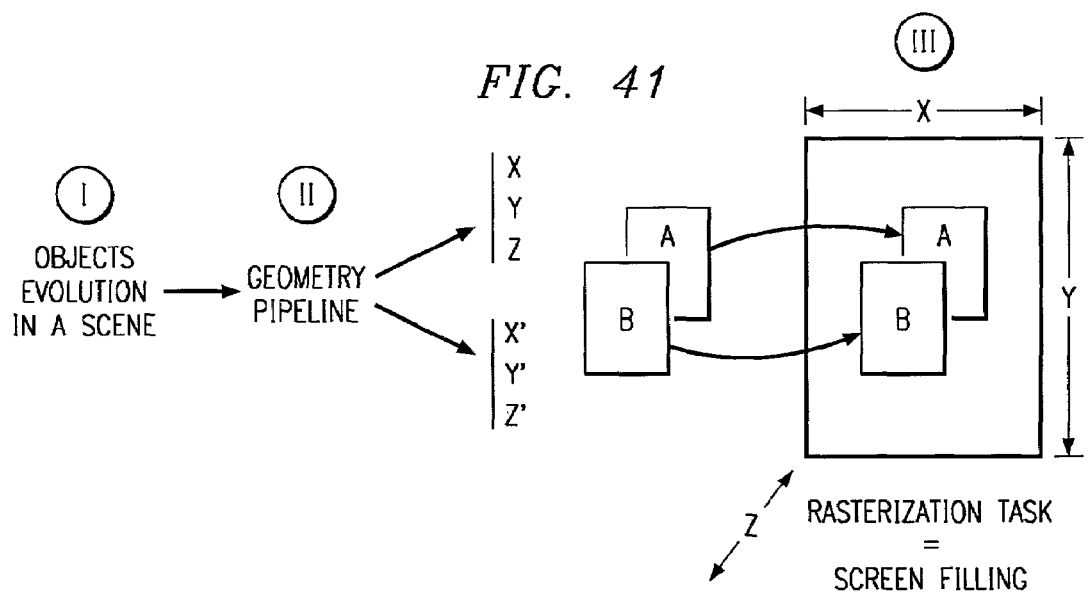
FIG. 41 illustrates the geometry pipeline and rasterization task performed in the DSP.

Recall that one of the biggest problems in image processing is duplicative storage for portions of objects overlapped by other objects within an image. Also consider that each object is made up of triangles (T1, T2, etc.), as is well known in the art. In a dual processor system implementing the present invention (in this case a RISC processor (ARM processor, as an example) in combination if a DSP), evolving objects in a scene is performed in the RISC processor (step I). The geometry pipeline (step II) or the rasterization process (step III) are performed by the DSP with division operations being performed in the hardware accelerator, as illustrated in FIG. 41. Accordingly, object triangles T1, T2, etc+screen memory are stored in memory. What the invention saves is the duplication of the triangles, position of the triangles, which can be in the range of, for example: 5000 triangles to display the image (including objects)(max case)×3 formations (which are the three coordinates)×16 bits=15 {kWords} of duplication, which represents 15×16 kbits of memory=250 kbits of memory for a typical scene of 5000 triangles. The invention contemplates steps II & III being performed in the DSP+division of Hw accelerator.

In fractional division, such as performed by Pentium an others, fractional division is accelerated by grouping the digits as quickly as possible. The usual sofware approach in the C55x takes it bit by bit which gives 16 cycles but it has to do a bunch of things before, such as conversions, because, in this algorithm values of operands A, B signed values and the Div_s algorithm applies on unsigned values only. The whole processing takes, then, 16 cycles added with 4 cycles to do sign conversions. Hence a total of 20 cycles for the complete division in software without the invention.

Figure 42:
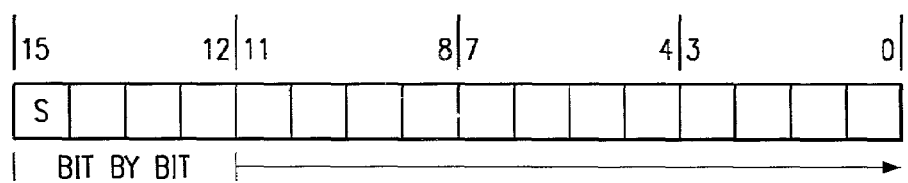
FIG. 42 illustrates splitting the work of 16 bits into 4 digits of 4 bits.

A novel concept of the invention is splitting the work into 4 digits of 4 bits, as illustrated in FIG. 42. Instead of doing the operation described above on decimal basis, build the representation on a hexadecimal basis. The same division method described above can be applied to signed and unsigned number, hence there's no need to convert them to absolute values. The invention also contemplates implementing the functionality of the hardware accelerator of the present invention into the DSP itself (as part the main ISA).

Thus, an advantage of the invention is that all of the basic mechanisms are within the hardware accelerator 102, the RAM 104 and the DSP core 18. The hardware accelerator receives data in the same way as other operators in the DSP because it is seen as a DSP resource by the instruction set. It can receive up to three values from memory per cycle. It knows about the internal resources through two read and two write buses to get two of the accumulator contents. It doesn't have to know about transfer of data from one part of the system to another. The hardware accelerator controls are exported from the DSP instruction to the edge of the processor. There is a strobe signal which is 1 bit (Hwstrobe), a micro-instruction which is 8-bits (Hwinst), a set of stalls indicators in the DSP pipeline (Hwstall) for optional control of internal state machines of the accelerator that should be maintained in sync with the pipeline activity and a bus error flag that is returned to the processor and merged into its bus error management (Hwerror). Decoding of the micro-instruction word can be done so that upper 3 bits identify a given hardware accelerator and the 5 lower bits define 32 instructions per accelerator. By using these three bits to select a hardware accelerator, a user can manage the connection to the accumulators write buses (through either tri-state or mux-based implementation).

In addition the invention exports a set of status lines coming out of the DSP such as rounding mode, so that it can be aware of the arithmetic modes that are used by the DSP and the hardware accelerator model is sending back "zero result flags" associated with the 2 40-bit results.

The hardware accelerator, as disclosed, is physically separate from the DSP core. A user of the invention should be able to connect the hardware accelerator and a DSP together, from a software point of view, and use the hardware accelerator as if it were part of the instruction set. The invention discloses some classes of instructions—and contemplates other classes—but from a software standpoint, a user can put the control of these in software loops. It could connect this model to the software simulator to debug its software. Then, a user could move the hardware accelerator functional view to VHDL in order to generate the gate level view. As a result, the impact of this is in several steps in the design flow—application level and design level. For design level a user will also need timing information for the performance information of the pins, etc.

If the DSP ultimately selected is not of the TI-DSP #C55x family, or if the functionality of the class of instructions in the DSP (TI-DSP #C55x) are not used then, alternatively, the invention contemplates use of a processor "copr" instruction, which can be generated in the processor's instruction table which can be put in parallel with any instruction which extracts from some instructions, fields of the instructions. As an example, there is an op code field and some reference to memory access (op-code field is all the zeros on page—as previously disclosed). The result is a reference to memory dual memory (xxxmmmyyy) along with (MMM) code which is the third access. On top of this, there are source and destination of accumulators (ooDD & uuDD) and all the remaining fields which define (in a dual-mac for example) the op-codes controlling the processing function. Four times two bits would be exported at this interface boundary, defining the eight bits to control the hardware accelerator. The invention also contemplates the definition of an instruction of the main ISA that would implement, with or wihout pipeline stages, one of the division stages described above. This instruction could then be executed alone or in parallel with the same in order to execute multiple divide operations at the same time.

While the present invention has been disclosed in a single processor system, providing multiple operation in both single and multi-cycle operation, the invention also contemplates other embodiments. As an example, the hardware accelerator can be used to connect two DSPs (TI C55xs in this case—as shown generally at 148 in FIG. 21) cores together, because what can be done in a single core embodiment can also be used in a multi-core embodiment to synchronize the transfer of internal resources of one core to the other, using the hardware accelerator protocol. Thus, it may be desirable to have two cores and a hardware accelerator on the same chip when there is a need to exchange some of the computation, via daisy chaining—similar to what can be done in SIMD machines where operators exchange values—especially if they share the same program or execute the same type of program.

Figures 43, 44, 46:
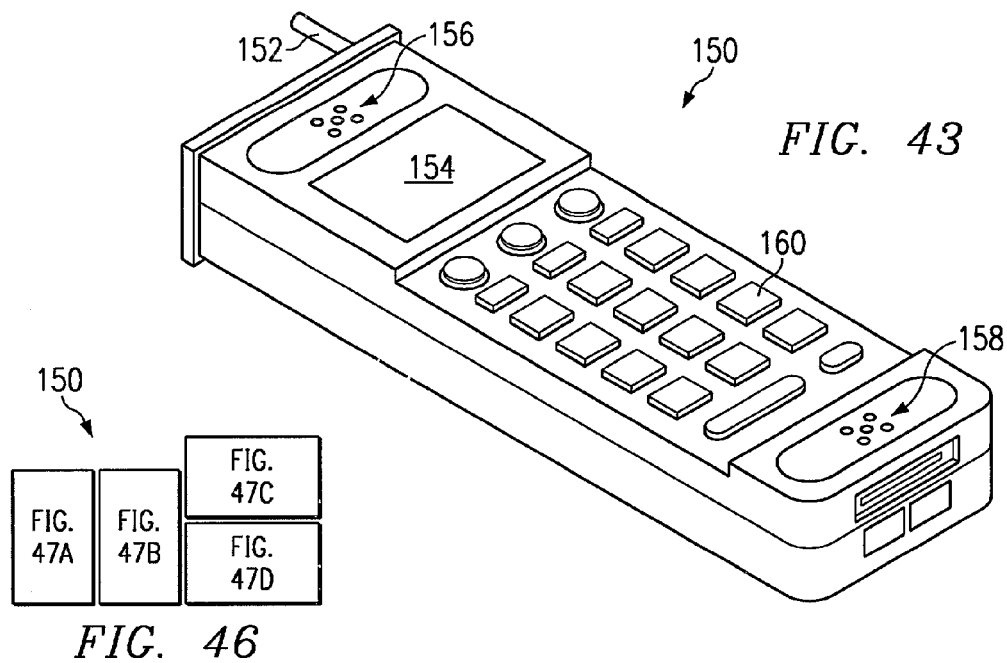
FIG. 43 illustrates a portable telephone that incorporates the present invention.
FIG. 44 is a block diagram of various peripherals coupled to processor 168.
FIG. 46 is a block diagram of telephone 150.

FIG. 43 illustrates a portable telephone (shown generally at 150) which incorporates the invention. FIG. 44 illustrates a block diagram of various peripherals coupled to a processor 168, according an embodiment of the invention. A processor 168 (TI C55x DSP) is coupled to a program memory or cache 170, a data memory 172, a RHEA bus bridge 174 and to hardware accelerators 102. These hardware accelerators are also coupled to data memory 172. A DMA 176 couples data memory 172 to RHEA bus bridge 174.

Figure 45:
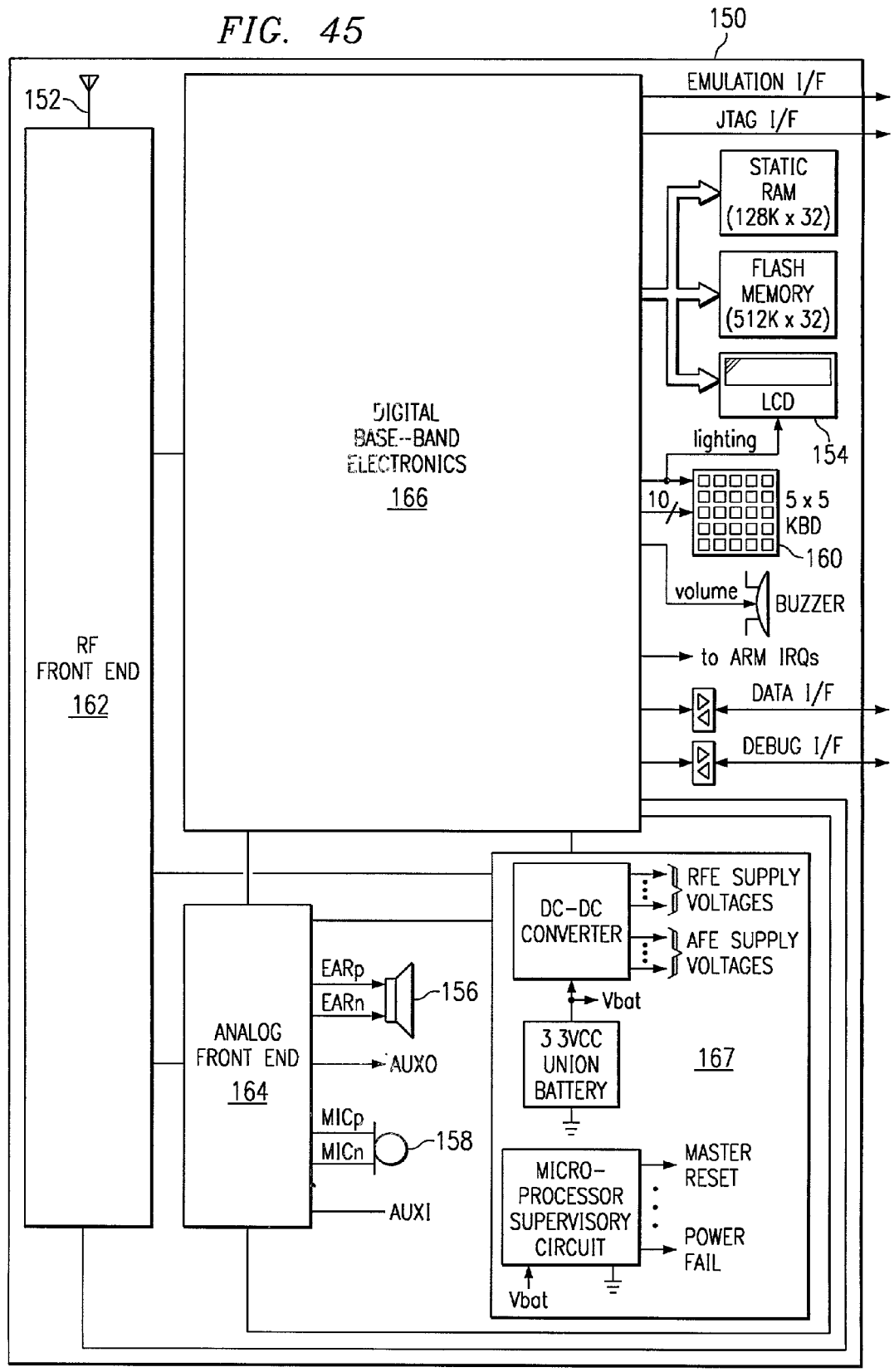
FIG. 45 is a block diagram of the major components of telephone 150.

FIG. 45 is a basic block diagram of portable telephone 150. Telephone 150 includes an antenna 152, an LCD display 154, a speaker 156, a microphone 158 and a keyboard 160. Portable telephone 150 further comprises an RF Front End (RF chip) 162 coupling an analog front end (analog base band chip) 164 and digital base band electronics (digital base band chip) 166 to antenna 152. A power source 167 is connected to RF front end 162, analog front end 164, and digital base band 166. Hardware accelerator 102 is located within digital base band 166.

Figure 47A:
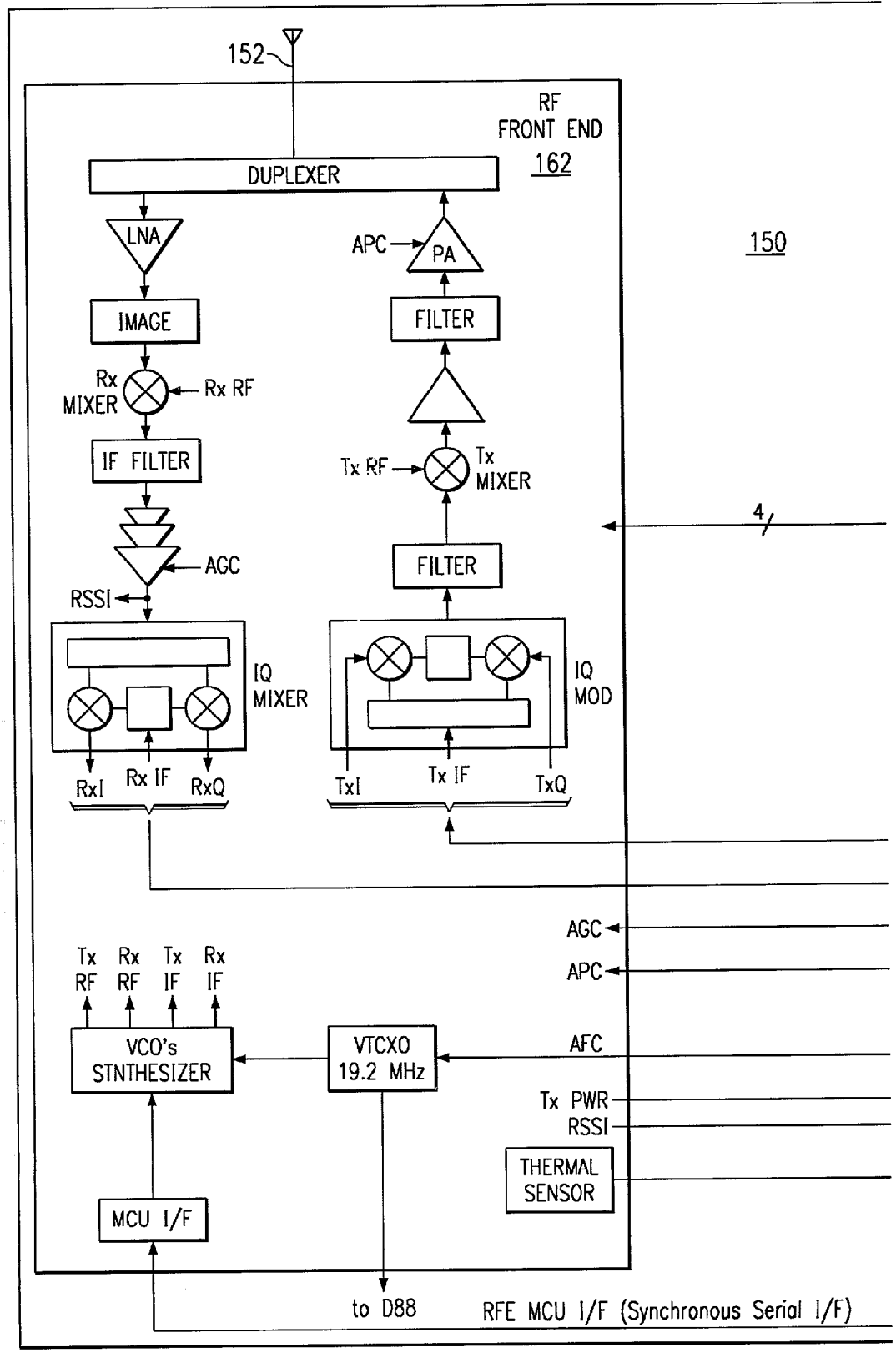
FIG. 47A is a schematic diagram of block 47A of FIG. 46.
Figure 47B:
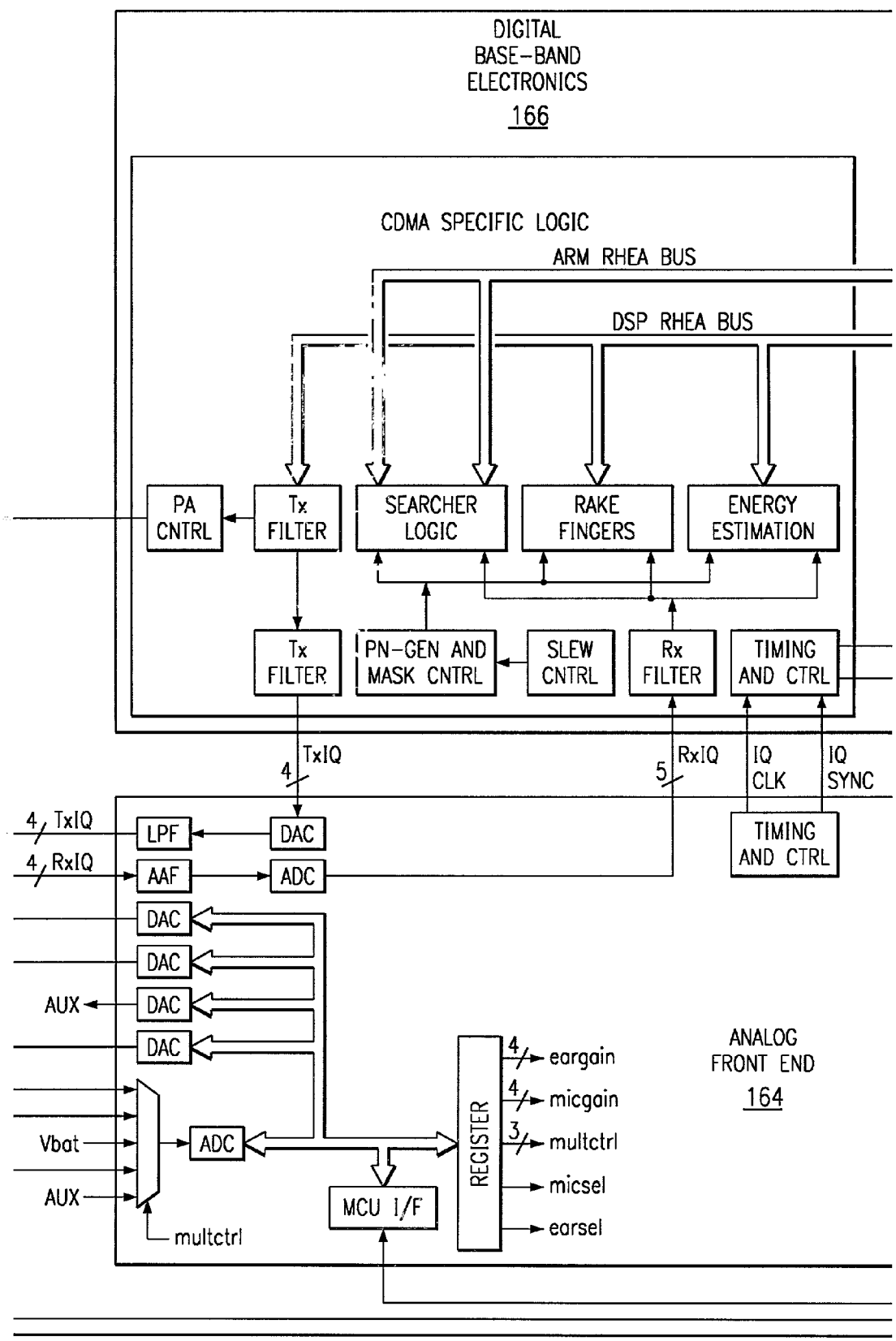
FIG. 47B is a schematic diagram of block 47B of FIG. 46.
Figure 47C:
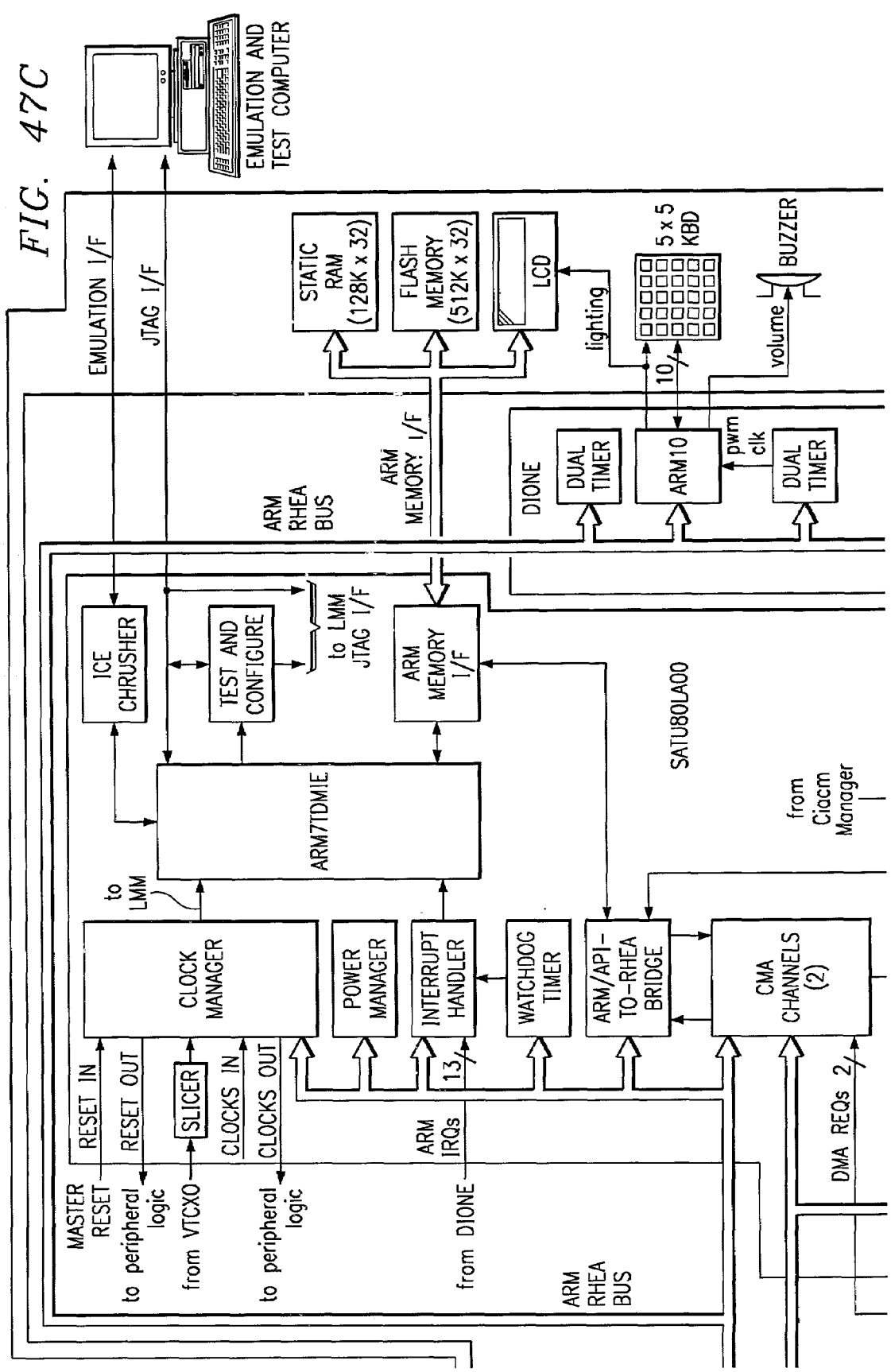
FIG. 47C is a schematic diagram of block 47C of FIG. 46.
Figure 47D:
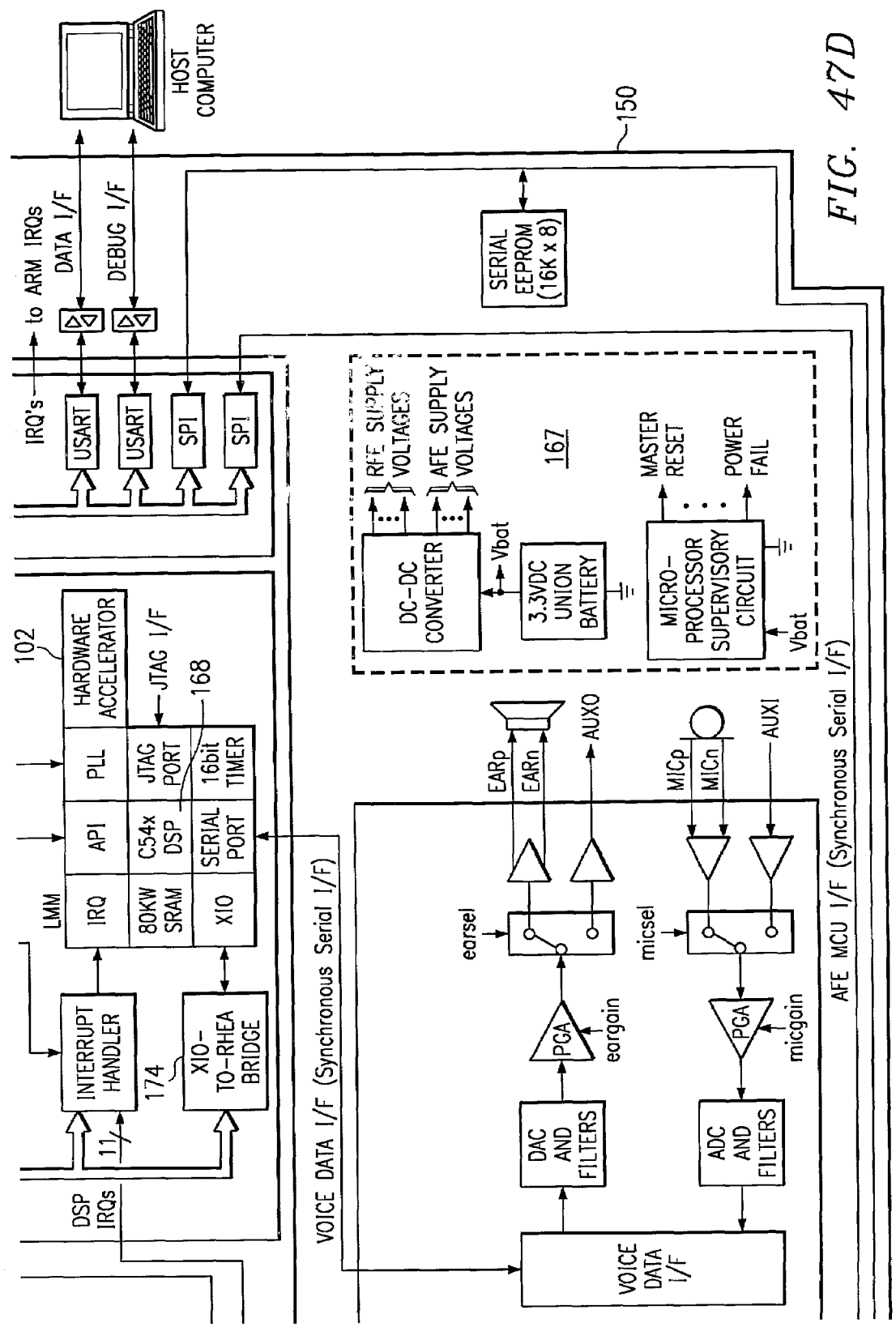
FIG. 47D is a schematic diagram of block 47D of FIG. 46.

FIG. 46 is a block diagram of telephone 150. FIG. 47A is a schematic diagram of block 47A of FIG. 46. FIG. 47B is a schematic diagram of block 47B of FIG. 46. FIG. 47C is a schematic diagram of block 47C of FIG. 46. FIG. 47D is a schematic diagram of block 47D of FIG. 46.

While the present invention has been described with respect to specific embodiments thereof, this description is not to be construed in a limiting sense. For example, while a cellular telephone is disclosed that utilizes CDMA techniques, other communication techniques may also be used. Similarly, various changes and modifications may be apparent to persons skilled in the art upon reference to this description. It is therefore contemplated that the appended claims will cover any such modifications or embodiments as fall within the true scope of the invention.

What is claimed:

1. A data processing apparatus, comprising:
   a random access memory;
   a hardware accelerator coupled to said random access memory; and
   a digital signal processor (DSP) coupling said hardware accelerator to said random access memory, said hardware accelerator enabling said digital signal processor (DSP) to perform high speed division operations.

2. The data processing apparatus of claim 1, further including a second digital signal processor (DSP) coupled to said random access memory.

3. The data processing apparatus of claim 1, wherein at least one of said high speed division operations is performed in 2 cycles.

4. The data processing apparatus of claim 1, wherein at least one of said high speed division operations is in fractional format.

5. The data processing apparatus of claim 1, wherein at least one of said high speed division operations is performed by regular instructions in the main ISA of the DSP.

6. The data processing apparatus of claim 1, wherein at least one of said high speed division operations is 2 cycle division in a fractional format.

7. The data processing apparatus of claim 1, wherein said digital signal processor (DSP) comprises an address generation unit coupled to said random access memory, data accumulators coupled to said hardware accelerator, status flags coupled to said hardware accelerator and co-processor instructions interface coupled to said hardware accelerator.

8. A data processing apparatus, comprising:
   a random access memory;
   a hardware accelerator coupled to said random access memory; and a digital signal processor (DSP) coupling said hardware accelerator to said random access memory, said hardware accelerator enabling said digital signal processor (DSP) to perform high speed division operations, wherein said hardware accelerator comprises:

a decoder;

a first register coupling said decoder to an operator kernel; and a clock controller coupled to said operator kernel.

9. A telecommunication device, comprising:

a random access memory;

a hardware accelerator coupled to said random access memory;

a digital circuitry coupling said hardware accelerator to said random access memory, said hardware accelerator enabling said digital circuitry to perform high speed division operations;

analog circuitry;

RF circuitry coupling said analog circuitry and said digital circuitry to an antenna; and a power source connected to said RF, analog and digital circuitry.

10. The telecommunications device of claim 9, wherein said digital circuitry is a digital signal processor (DSP).

11. The telecommunication device of claim 9, wherein said RF circuitry comprises an RF front end, said analog circuitry comprises an analog front end and said digital circuitry comprises digital base band electronics.

12. The telecommunication device of claim 9, further including a display and a keyboard coupled to said digital circuitry and a speaker and a microphone coupled to said analog circuitry.

13. A method, comprising the steps of:

providing a processor; and performing a division operation associated with said processor in two cycles, wherein said division operation is enabled by a hardware accelerator, said hardware accelerator comprising:

a decoder;

a first register coupling said decoder to an operator kernel; and a clock controller coupled to said operator kernel.

* * * * *